US012279255B2

(12) United States Patent
Fakoorian et al.

(10) Patent No.: US 12,279,255 B2
(45) Date of Patent: Apr. 15, 2025

(54) RELEASE OF SEMI-PERSISTENT SCHEDULING (SPS) CONFIGURATIONS OF DOWNLINK TRANSMISSION OCCASIONS

(71) Applicant: QUALCOMM Incorporated, San Diego, CA (US)

(72) Inventors: Seyed Ali Akbar Fakoorian, San Diego, CA (US); Wei Yang, San Diego, CA (US); Seyedkianoush Hosseini, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 577 days.

(21) Appl. No.: 17/443,830

(22) Filed: Jul. 28, 2021

(65) Prior Publication Data

US 2022/0039132 A1 Feb. 3, 2022

Related U.S. Application Data

(60) Provisional application No. 62/706,118, filed on Jul. 31, 2020.

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1819* (2013.01); *H04L 1/1896* (2013.01);
(Continued)

(58) Field of Classification Search
CPC . H04W 72/1273; H04W 76/30; H04W 72/23; H04W 72/0446; H04L 27/26025; H04L 1/1819; H04L 1/1896
See application file for complete search history.

(56) References Cited

U.S. PATENT DOCUMENTS 11,595,158 B2\* 2/2023 Wang .................... H04L 1/1812
11,923,985 B2\* 3/2024 Gao ...................... H04L 5/0055
(Continued)

FOREIGN PATENT DOCUMENTS

| WO | 2019226458 A1 | 11/2019 |
| WO | 2020075690 A1 | 4/2020 |
| WO | 2020242944 | 12/2020 |

OTHER PUBLICATIONS

Intel Corporation: "Remaining Issues on Enhanced DL SPS for IIoT", 3GPP Draft, R1-2002003, 3GPP TSG RAN WG1 Meeting #100bis-E, 3rd Generation Partnership Project (3GPP), Sophia-Antipolis Cedex, France, vol. RAN WG1, No. Online Meeting, Apr. 20, 2020-Apr. 30, 2020, Apr. 11, 2020 (Apr. 11, 2020), XP051875377, 5 Pages, Retrieved from the Internet: URL: https://ftp.3gpp.org/tsg_ran/WG1_RL1/TSGR1_100b_e/Docs/R1-2002003.zip, R1-2002003, Intel—IIoT DL SPS.docx [retrieved on Apr. 11, 2020] p. 1-p. 2.

(Continued)

*Primary Examiner* — Jael M Ulysse
(74) *Attorney, Agent, or Firm* — Kevin M. Donnelly; Haynes and Boone, LLP

(57) ABSTRACT

Some aspects of the present disclosure disclose methods and systems related to separate and joints releases of semi-persistent scheduling (SPS) configured transmission occasions by an SPS release. For example, a user equipment (UE) may receive, from a base station (BS) and via a physical downlink control channel (PDCCH), a semi-persistent scheduling (SPS) release configured to jointly release at the UE a plurality of SPS configurations, each SPS configuration of the plurality of SPS configurations configured to schedule one or more SPS physical downlink shared channel (PDSCH) transmission occasions of a plurality of SPS PDSCH transmission occasions. In some instances, the plurality of SPS PDSCH transmission occasions may occur in a same slot as the SPS release. Further, the UE may not (Continued)

expect to receive, or refrain from receiving, SPS PDSCH via the plurality of SPS PDSCH transmission occasions.

39 Claims, 17 Drawing Sheets

(51) Int. Cl.
- H04L 1/1867 (2023.01)
- H04L 27/26 (2006.01)
- H04W 72/0446 (2023.01)
- H04W 72/23 (2023.01)
- H04W 76/30 (2018.01)

(52) U.S. Cl.
CPC ... *H04L 27/26025* (2021.01); *H04W 72/0446* (2013.01); *H04W 72/23* (2023.01); *H04W 76/30* (2018.02)

(56) References Cited

U.S. PATENT DOCUMENTS

| | | | |
|---|---|---|---|
| 2012/0320805 A1* | 12/2012 | Yang | H04L 5/0053 370/280 |
| 2017/0026942 A1* | 1/2017 | Vajapeyam | H04W 72/23 |
| 2018/0279274 A1* | 9/2018 | Sun | H04W 72/23 |
| 2019/0021085 A1* | 1/2019 | Mochizuki | H04W 76/27 |
| 2019/0140808 A1* | 5/2019 | Matsuda | H04W 76/27 |
| 2019/0173612 A1* | 6/2019 | Kimura | H04L 1/0063 |
| 2019/0320437 A1 | 10/2019 | Gupta et al. | |
| 2019/0363842 A1 | 11/2019 | Fu et al. | |
| 2020/0252168 A1* | 8/2020 | Kim | H04W 72/1268 |
| 2020/0351025 A1 | 11/2020 | Choi et al. | |
| 2020/0359401 A1 | 11/2020 | Yoshimura et al. | |
| 2021/0076409 A1* | 3/2021 | Goto | H04W 72/1268 |
| 2021/0160879 A1* | 5/2021 | Lin | H04W 72/0453 |
| 2021/0218504 A1* | 7/2021 | Wang | H04L 1/1812 |
| 2021/0243782 A1* | 8/2021 | Miao | H04L 5/0091 |
| 2021/0266944 A1* | 8/2021 | Noh | H04L 5/0094 |
| 2022/0070900 A1* | 3/2022 | Yin | H04L 1/0003 |
| 2022/0337357 A1* | 10/2022 | Takahashi | H04L 5/0055 |
| 2022/0377796 A1* | 11/2022 | Jung | H04W 72/1263 |
| 2023/0098805 A1* | 3/2023 | Wang | H04W 72/20 370/329 |
| 2023/0164761 A1* | 5/2023 | Gerami | H04W 72/23 370/329 |
| 2023/0337246 A1* | 10/2023 | Saber | H04W 72/044 |

OTHER PUBLICATIONS

International Search Report and Written Opinion—PCT/US2021/043618—ISA/EPO—Nov. 19, 2021.

ZTE Corporation: "Remaining Issues on Cross-Carrier Scheduling with Mixed Numerologies", R1-2001622, 3GPP TSG RAN WG1 Meeting #100bis-e, 3rd Generation Partnership Project, Sophia-Antipolis Cedex, France, vol. RAN WG1, Apr. 11, 2020, XP051875211, Retrieved from the Internet: URL:https://ftp.3gpp.org/tsg_ran/WG1_RL1/TSGR1_100b_e/Docs/R1-2001622.zip, R1-2001622 Remaining-Issues on Cross-Carrier Scheduling with Mixed Numerologies v0.docx [retrieved on Apr. 11, 2020] Section 2 HARQ ACK for SPS Release, p. 1—p. 2, figure 1.

Intel Corporation: "Remaining Issues on Enhanced DL SPS for IIoT", 3GPP TSG RAN WG1 Meeting #100bis-E, R1-2002003, e-Meeting, Apr. 20-Apr. 30, 2020, Sec. 2-3, pp. 1-5.

Taiwan Search Report—TW110127906—TIPO—Dec. 28, 2024.

* cited by examiner

RELEASE OF SEMI-PERSISTENT SCHEDULING (SPS) CONFIGURATIONS OF DOWNLINK TRANSMISSION OCCASIONS

CROSS REFERENCE TO RELATED APPLICATIONS

The present application claims priority to and the benefit of the U.S. Provisional Patent Application No. 62/706,118, filed Jul. 31, 2020, titled "Release of Semi-Persistent Scheduling (SPS) Configurations of Downlink Transmission Occasions," which is hereby incorporated by reference in its entirety as if fully set forth below and for all applicable purposes.

FIELD OF TECHNOLOGY

The following relates generally to wireless communications and more specifically to the separate and joints releases of semi-persistent scheduling (SPS) configured transmission occasions by an SPS release.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In wireless communication systems that operate in accordance to Releases 15 and 16 of the "3rd Generation Partnership Project" (3GPP), transmissions over one or more channels are scheduled to permit multiple devices to communicate using the one or more channels. Scheduling is the process of allocating resources for transmitting data. New radio (NR) scheduling is dictated by network (e.g., gNodeB or gNB) and the user equipment (UE) just follows the schedule the network indicates. The overall scheduling mechanism in NR is similar to long-term evolution (LTE) scheduling, but NR has finer granularity than LTE especially in terms of time domain scheduling at the physical layer. There are two types of scheduling for downlink communications (e.g., from a gNodeB to a UE). One is called "Dynamic Scheduling" and the other one SPS (Semi Persistent Scheduling). Dynamic scheduling is the mechanism in which each and every physical downlink shared channel (PDSCH) is scheduled by a Downlink Control Indicator or Downlink Control Information (DCI). SPS is the mechanism in which the PDSCH transmission is scheduled by an RRC message (or DCI). The PDSCH is divided into slots, in which data is transmitted. User data traffic is transmitted, between a gNodeB and a UE, in a PDSCH, and the UE transmits a requisite acknowledgement/negative-acknowledgment (ACK/NACK) report at a specified time on the uplink channels.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, a method of wireless communication performed by a user equipment (UE) comprises receiving, from a base station (BS) and via a physical downlink control channel (PDCCH), a semi-persistent scheduling (SPS) release configured to jointly release at the UE a plurality of SPS configurations, each SPS configuration of the plurality of SPS configurations configured to schedule one or more SPS physical downlink shared channel (PDSCH) transmission occasions of a plurality of SPS PDSCH transmission occasions. In some aspects, the plurality of SPS PDSCH transmission occasions can occur in a same slot as the SPS release. The method further comprises refraining from receiving data transmission via at least one of the plurality of SPS PDSCH transmission occasions in response to the receiving the SPS release.

Some aspects of the present disclosure disclose a method of wireless communication performed by a user equipment (UE). The method comprises receiving, from a base station (BS) and via a physical downlink control channel (PDCCH) at a slot of a radio frame structure having a first numerology, a semi-persistent scheduling (SPS) release configured to release at the UE a SPS configuration configured to schedule a plurality of SPS physical downlink shared channel (PDSCH) transmission occasions at multiple slots of a radio frame structure having a second numerology different from the first numerology. In some aspects, the slot of the radio frame structure having the first numerology can coincide with the multiple slots of the radio frame structure having the second numerology. Further, the method comprises refraining from receiving data transmission via at least one of the plurality of SPS PDSCH transmission occasions in response to the receiving the SPS release.

In some aspects of the present disclosure, a user equipment (UE) comprises a transceiver and a processor. The transceiver is configured to receive, from a base station (BS) and via a physical downlink control channel (PDCCH), a semi-persistent scheduling (SPS) release configured to jointly release at the UE a plurality of SPS configurations, each SPS configuration of the plurality of SPS configurations configured to schedule one or more SPS physical downlink shared channel (PDSCH) transmission occasions of a plurality of SPS PDSCH transmission occasions. In some aspects, the plurality of SPS PDSCH transmission occasions can occur in a same slot as the SPS release. Further, the processor can be configured to refrain from receiving data transmission via at least one of the plurality of SPS PDSCH transmission occasions in response to the receiving the SPS release.

Some aspects of the present disclosure disclose a user equipment (UE) comprising a transceiver and a processor. In some aspects, the transceiver is configured to receive, from a base station (BS) and via a physical downlink control channel (PDCCH) at a slot of a radio frame structure having a first numerology, a semi-persistent scheduling (SPS) release configured to release at the UE a SPS configuration configured to schedule a plurality of SPS physical downlink shared channel (PDSCH) transmission occasions at multiple slots of a radio frame structure having a second numerology different from the first numerology. In some aspects, the slot of the radio frame structure having the first numerology can coincide with the multiple slots of the radio frame structure having the second numerology. Further, the processor can be configured to refrain from receiving data transmission via at least one of the plurality of SPS PDSCH transmission occasions in response to the receiving the SPS release.

Some aspects of the present disclosure disclose a non-transitory computer-readable medium (CRM) having program code recorded thereon. In some aspects, the program code comprising code for causing a user equipment (UE) to receive, from a base station (BS) and via a physical downlink control channel (PDCCH), a semi-persistent scheduling (SPS) release configured to jointly release at the UE a plurality of SPS configurations, each SPS configuration of the plurality of SPS configurations configured to schedule one or more SPS physical downlink shared channel (PDSCH) transmission occasions of a plurality of SPS PDSCH transmission occasions. In some aspects, the plurality of SPS PDSCH transmission occasions can occur in a same slot as the SPS release. The program code further comprises code for causing the UE to refrain from receiving data transmission via at least one of the plurality of SPS PDSCH transmission occasions in response to the receiving the SPS release.

Some aspects of the present disclosure disclose a non-transitory computer-readable medium (CRM) having program code recorded thereon. In some aspects, the program code comprising code for causing a user equipment (UE) to receive, from a base station (BS) and via a physical downlink control channel (PDCCH) at a slot of a radio frame structure having a first numerology, a semi-persistent scheduling (SPS) release configured to release at the UE a SPS configuration configured to schedule a plurality of SPS physical downlink shared channel (PDSCH) transmission occasions at multiple slots of a radio frame structure having a second numerology different from the first numerology. In some aspects, the slot of the radio frame structure having the first numerology can coincide with the multiple slots of the radio frame structure having the second numerology. In some aspects, the program code comprises code for causing the UE to refrain from receiving data transmission via at least one of the plurality of SPS PDSCH transmission occasions in response to the receiving the SPS release.

Some aspects of the present disclosure disclose a user equipment (UE), comprising: means for receiving, from a base station (BS) and via a physical downlink control channel (PDCCH), a semi-persistent scheduling (SPS) release configured to jointly release at the UE a plurality of SPS configurations, each SPS configuration of the plurality of SPS configurations configured to schedule one or more SPS physical downlink shared channel (PDSCH) transmission occasions of a plurality of SPS PDSCH transmission occasions. In some aspects, the plurality of SPS PDSCH transmission occasions occurring in a same slot as the SPS release. The UE further comprises means for refraining from receiving data transmission via at least one of the plurality of SPS PDSCH transmission occasions in response to the receiving the SPS release.

Some aspects of the present disclosure disclose a user equipment (UE), comprising: means for receiving, from a base station (BS) and via a physical downlink control channel (PDCCH) at a slot of a radio frame structure having a first numerology, a semi-persistent scheduling (SPS) release configured to release at the UE a SPS configuration configured to schedule a plurality of SPS physical downlink shared channel (PDSCH) transmission occasions at multiple slots of a radio frame structure having a second numerology different from the first numerology. In some aspects, the slot of the radio frame structure having the first numerology can coincide with the multiple slots of the radio frame structure having the second numerology. The UE further comprises means for refraining from receiving data transmission via at least one of the plurality of SPS PDSCH transmission occasions in response to the receiving the SPS release.

Some aspects of the present disclosure disclose a method of wireless communication performed by a base station (BS). The method comprises identifying a timing condition between a semi-persistent scheduling (SPS) release and a plurality of SPS physical downlink shared channel (PDSCH) transmission occasions in a slot. In some instances, the SPS release is configured to jointly release at a user equipment (UE) a plurality of SPS configurations. In some instances, each SPS configuration of the plurality of SPS configurations is configured to schedule one or more of the plurality of SPS PDSCH transmission occasions. Further, the method comprises transmitting the SPS release to the UE in the slot based on the timing condition.

Some aspects of the present disclosure disclose a base station (BS) comprising a transceiver and a processor. In some aspects, the transceiver is configured to identify a timing condition between a semi-persistent scheduling (SPS) release and a plurality of SPS physical downlink shared channel (PDSCH) transmission occasions in a slot, the SPS release configured to jointly release at a user equipment (UE) a plurality of SPS configurations; and each SPS configuration of the plurality of SPS configurations configured to schedule one or more of the plurality of SPS PDSCH transmission occasions. Further, the transceiver is configured to transmit the SPS release to the UE in the slot based on the timing condition.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
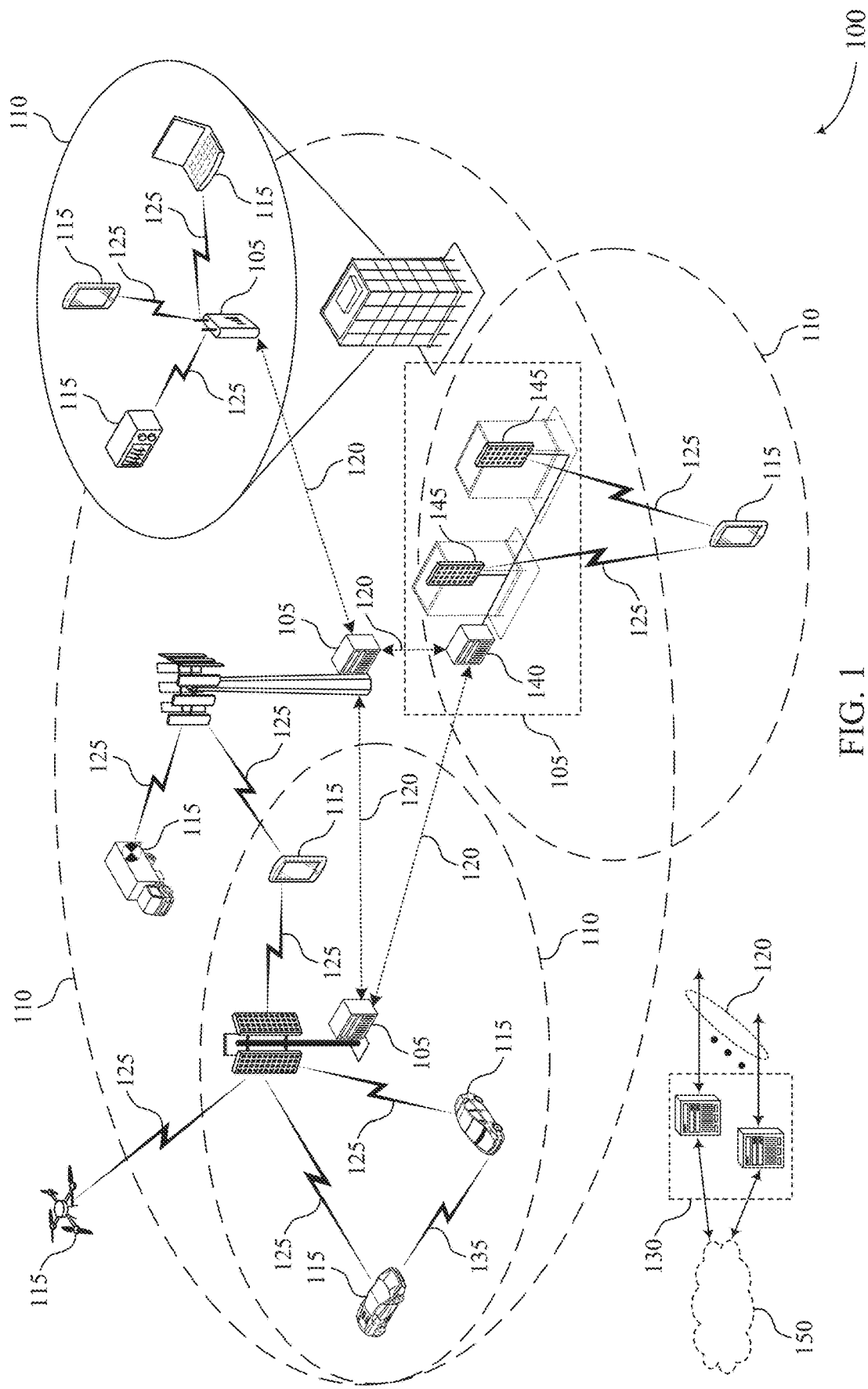
FIG. 1 illustrates a wireless communication network, according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In wireless communication networks operating according to Releases 15 and 16 of the 3GPP, multiple active semi-persistent scheduling (SPS) configurations for a given bandwidth part (BWP) of a serving cell may be supported to enhance reliability and reduce latency for data traffic or service types such as enhanced mobile broadband (eMBB), ultra-reliable low-latency communications (URLLC), etc. The maximum number of uplink (UL) configured grant (CG) configurations per BWP of a serving cell is 12 and a user equipment (UE) may have multiple SPS configurations (and a single SPS configuration may be shared between several UEs). A base station (e.g., gNB) may activate or release the SPS configurations via a downlink control information (DCI). In some cases, the base station may separately activate SPS configurations, for example via an activate DCI (e.g., DCI format 0_0, 0_1 and 0_2), but not jointly. That is, joint activation of multiple SPS configurations may not be supported. The DCI activating a SPS configuration may include a hybrid automatic repeat request (HARD) process number (HPN) field indicating the configuration index of the SPS configuration that is being activated by the DCI. In some cases, there can be maximum four least significant bits of HPN field to indicate the SPS configuration that is being activated. In release 16 of 3GPP, the minimum SPS periodicity is reduced to 1 slot.

In some cases, joint as well as separate releases of multiple SPS configurations for a given BWP of a serving cell may be supported. For example, a base station may transmit a release DCI (e.g., DCI format 0_0, 0_1 and 0_2) including configuration indices to identify the SPS configurations that are to be released by the DCI. In some cases, there can be maximum four least significant bits of HPN field to indicate the SPS configurations that are being released (e.g., separately or jointly) by the release DCI. In the case of separate releases of SPS configurations, the HPN in the release DCI may indicate the SPS configuration index that may be released by the release DCI. In the case of joint release of multiple SPS configurations by a single DCI, and where a table of states is higher layer configured, a state can be used to indicate a single SPS configuration or multiple SPS configurations to be released, where each state can be mapped to the single SPS configuration or multiple SPS configuration. In the case of no higher layer configured state(s), separate release can be used where the release may correspond to the SPS configuration index indicated by the release DCI. The codepoint by the HPN may map to the row index of the configured table of states. For instance, row 0 of an RRC table for joint release of SPS configurations may map to configuration indices 1 and 3, row 1 to configuration indices 0 and 2, and row 2 to configuration index 4. SPS is discussed in the 3GPP document TS 38.213, titled "Technical Specification 5G; NR; Physical layer procedure for control (3GPP TS 38.213 version 15.5.0 Release 15)", May 2019, which is incorporated herein by reference in its entirety.

In general, a UE may transmit to the base station a HARQ acknowledgment (ACK) or negative-acknowledgement (NACK) to inform the base station about the successful or unsuccessful arrival of data transmitted to the UE (e.g., via physical downlink shared channel (PDSCH)). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

For both type-1 and type-2 HARQ-ACK codebook construction, one HARQ-ACK bit may be generated for release of SPS configured transmission occasion (e.g., SPS PDSCH release) with a joint release DCI. HARQ-ACK codebook may refer to the mechanism to transmit multiple ACK/

NACK bits in a same transmission, such as determining the number and ordering of the ACK/NACK bits. The HARQ-ACK bit location for SPS PDSCH release with a separate release DCI can be derived based on the TDRA table row index indicated in the activation DCI and the PDSCH-to-HARQ timing indicator K1 indicated in the release DCI. Further, the HARQ-ACK bit location for SPS PDSCH release with a joint release DCI can be derived based on the TDRA table row index indicated in the activation DCI for SPS PDSCH with the lowest SPS configuration index among the jointly released configurations and K1 indicated in the release DCI. In release 16 of 3GPP, when the SPS configurations are released by a joint release DCI, multiple SPS configurations to be released by the joint release DCI may have the same priority.

In releasing a SPS configuration of a transmission occasion scheduled for transmission via a PDSCH (alternatively referred herein as "SPS PDSCH" or "SPS configured transmission occasion"), an SPS release (alternatively referred herein as "SPS release PDCCH") may be transmitted to the UE via PDCCH and may occur in the same slot (e.g., of the radio frame structure of the 5G network) as that of the SPS PDSCH. The SPS release may be received in a slot before the end or termination of the reception, in the same slot, of a SPS PDSCH with the SPS configuration that is to be released by the SPS release. A one-bit HARQ-ACK may be generated for the SPS release and the UE may not expect to receive the SPS PDSCH (e.g., no data or SPS PDSCH is received at the UE) if HARQ-ACKs for the SPS release and the SPS PDSCH reception would map to the same physical uplink control channel (PUCCH) (e.g., the UE may refrain from receiving the SPS PDSCH or treat it as error if the SPS PDSCH arrives). The SPS release may not be received in a slot after the end or termination of the reception, in the same slot, of a SPS PDSCH with the SPS configuration that is to be released by the SPS release if HARQ-ACKs for the SPS release and the SPS PDSCH reception would map to the same PUCCH.

When a SPS release configured to release a SPS configuration or multiple SPS configurations (e.g., separately or jointly) is received in a slot, the SPS release may overlap in time with multiple SPS configured transmission occasions (e.g., due to mixed numerologies of NR) occurring in the same slot. In such cases, identifying or determining different schemes for releasing the SPS configured transmission occasions may be desired. That is, determining whether transmission data are received via any of the SPS configured transmission occasions depending on, for example, the overlap in time with the transmission occasions of the SPS release that is configured to release, separately or jointly, the SPS configuration of the transmission occasions, may be desired. Aspects of the present disclosure provide solutions to these and related scenarios associated with release of SPS configurations for multiple transmission occasions occurring in a slot by a SPS release overlapping with at least some of the multiple transmission occasions in the same slot.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates an example wireless communication network 100 according to some aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots.

Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Additionally, it is noted here that the subcarrier spacing (SCS) has an effect on the number of symbols, such as OFDM symbols, within a subframe. In particular, as SCS spacing gets wider or greater, the slot length will become shorter. For example, a scheduling cell (e.g., base station or gNB) can have an SCS of 15 kHz (i.e., spacing parameter $\mu=0$ in known spacing numerology where the SCS or frequency spacing $\Delta f$ is determined by the equation $\Delta f = 2^\mu \times 15$ kHz), which is typically the shortest used SCS spacing, and the scheduled cells (e.g., UEs) can utilize an SCS of 120 kHz (i.e., spacing parameter $\mu=3$ in known spacing numerology) for purposes of this example, but those skilled in the art will appreciate the present disclosure is applicable to any of a number of SCS spacings. In known systems, the 15 kHz SCS would result in a one (1) millisecond (ms) slot, which could also constitute an entire 1 ms subframe. The 120 kHz SCS would result in 8 slots having a duration of ⅛ or 0.125 ms in the 1 ms subframe. These slots can represent eight PDSCH transmissions in a scheduled cell that are scheduled by the PDCCH in the scheduling cell. Of further note, in this example the single slot of the scheduling cell overlaps in time with the eight slots of the scheduled cell when 15 kHz SCS and 120 kHz SCSs are respectively used for the two cells, but other SCS values will result in other numerologies and overlaps, such as one scheduling cell slot overlapping four slots of a scheduled cell in an example of 15 kHz SCS in the scheduling cell and 60 kHz SCS (i.e., $\mu=2$) in the scheduled cell.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may select values for scheduling or slot offset parameters in a radio frame structure representing resources (e.g., time-frequency resources) for signal communications between the UE 115 and the base stations 105, the requested values for the set of parameters based at least in part on system state information of the UE 115 and attributes related to an operational or activity mode of an application executing or operating on the UE 115. The UE 115 may transmit, to a base station 105, the selected values for the set of parameters. The UE 115 may receive, at least in part as response to the selected values for the set of parameters transmitted to the base station 105, the configured values for the set of slot offset parameters for the UE 115. The UE 115 may then communicate with the base station 105 according to the configured parameters.

Figure 2:
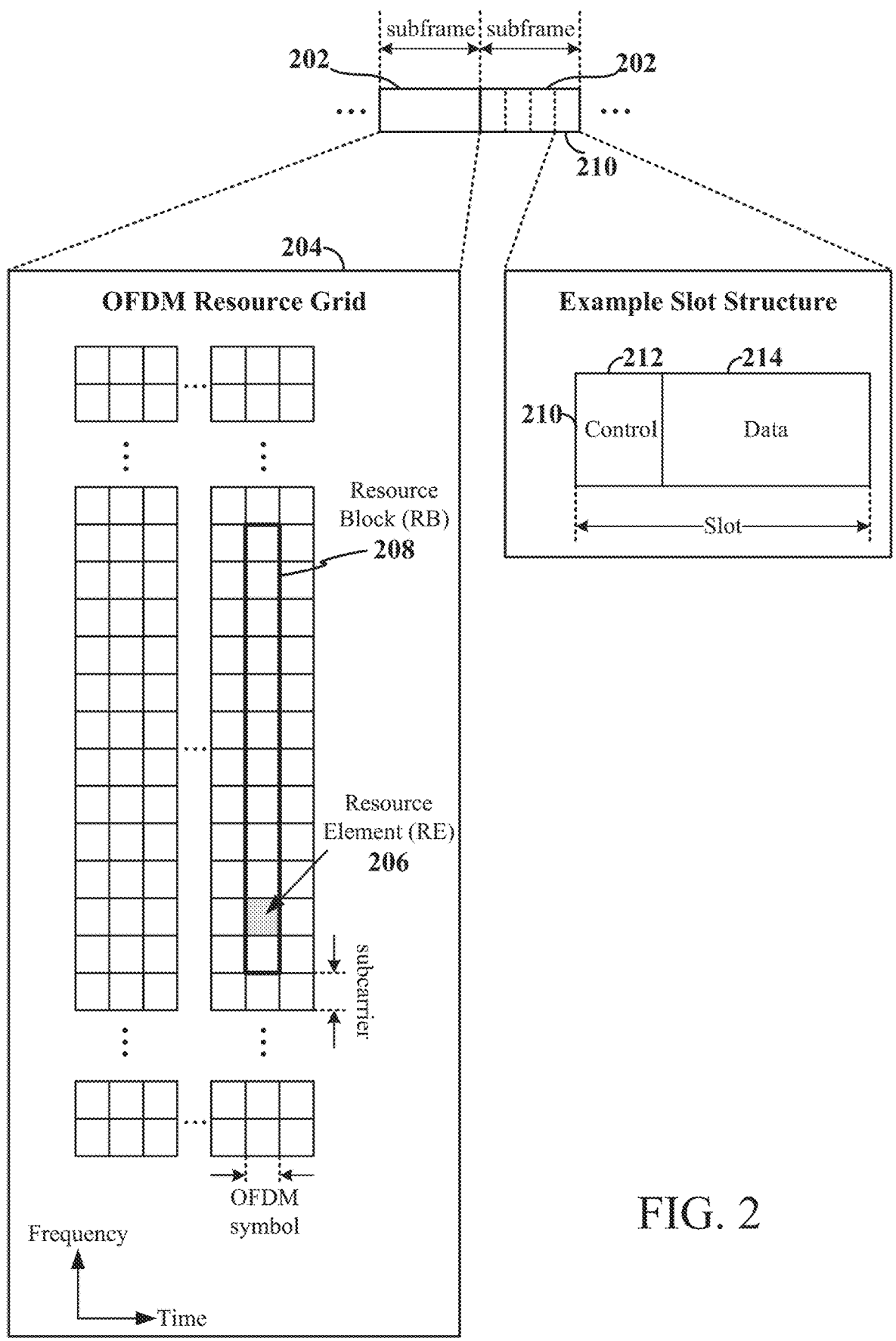
FIG. 2 illustrates an example schematic of an organization of wireless resources in an air interface utilizing orthogonal frequency divisional multiplexing (OFDM), according to some aspects of the present disclosure.

FIG. 2 illustrates an example schematic of an organization of wireless resources in an air interface utilizing orthogonal frequency divisional multiplexing (OFDM), according to some aspects of the present disclosure. It should be understood by those of ordinary skill in the art that the various aspects of the present disclosure may be applied, for example, to a DFT-s-OFDMA or an SC-FDMA waveform in substantially the same way as described herein below. That is, while some examples of the present disclosure may focus on an OFDM link for clarity, it should be understood that the same principles may be applied as well to DFT-s-OFDMA or SC-FDMA waveforms. In FIG. 2, an expanded view of an exemplary subframe 202 is illustrated, showing an OFDM resource grid. However, as those skilled in the art can readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The radio frame structure or resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. A RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, in some aspects, it can be assumed that a single RB such as the RB 208 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 206 within one or more sub-bands. Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

According to some examples, a frame may refer to a duration of 10 ms, with each frame sub-divided into 10 subframes 202 of 1 ms each. Each 1 ms subframe may consist of one or multiple adjacent slots. In the example shown in FIG. 2, subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., 1, 2, or 3 OFDM symbols). These mini-slots, or shortened TTIs, may in some cases be transmitted occupying resources scheduled for ongoing slot transmissions for the same or for different UEs. Any number of resource blocks may be utilized within a subframe or slot.

An expanded view of one of the slots 210 illustrates the slot as including a control region 212 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, the slot 210 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities (e.g., UEs). The PCFICH provides information to assist a receiving device in receiving and decoding the PDCCH. The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the scheduled entity may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), or any other suitable UCI.

In addition to control information, one or more REs 206 (e.g., within the data region 214) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry system information blocks (SIBs), carrying information that may enable access to a given cell.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., V2X or other sidelink device) towards a set of one or more other receiving sidelink devices. The PSCCH may include HARQ feedback information (e.g., ACK/NACK) that may be used to indicate a need, or lack of need, for retransmissions on the sidelink. The data region 214 of the slot 210 may include a physical sidelink shared channel (PSSCH) including the data transmitted by the initiating (transmitting) sidelink device within resources reserved over the sidelink carrier by the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above are not necessarily all the channels or carriers that may be utilized between a scheduling entity 108 and scheduled entities (e.g., one of more UE 106), and those of ordinary skill in the art may recognize that other channels or carriers may be utilized in addition to those illustrated, such as other traffic, control, and feedback channels.

Figure 3:
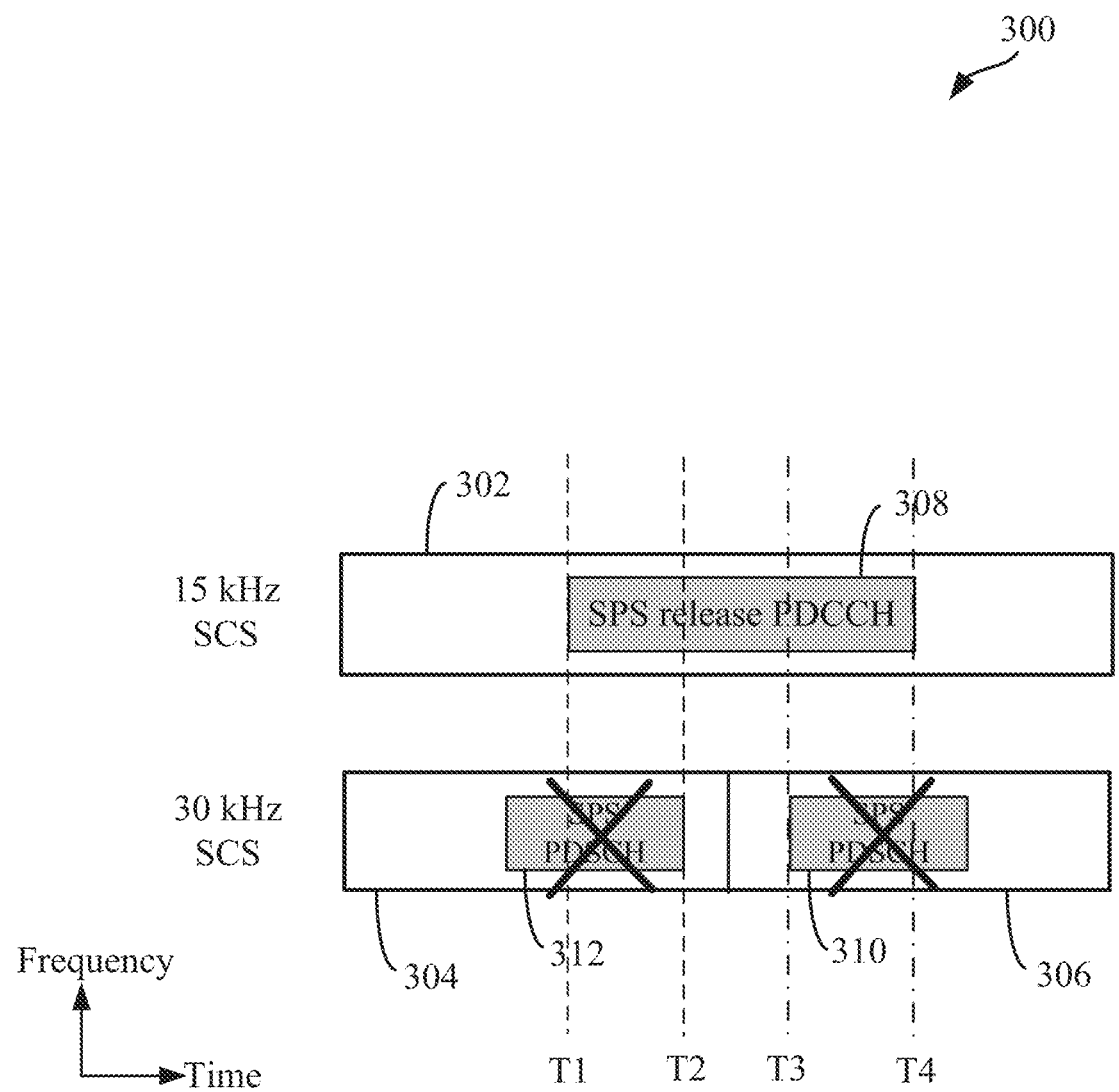
FIG. 3 illustrates example slot structures showing the separate release of semi-persistent scheduling (SPS) configuration for multiple physical downlink shared channel (PDSCH) transmission occasions, according to some aspects of the present disclosure.
Figure 4:
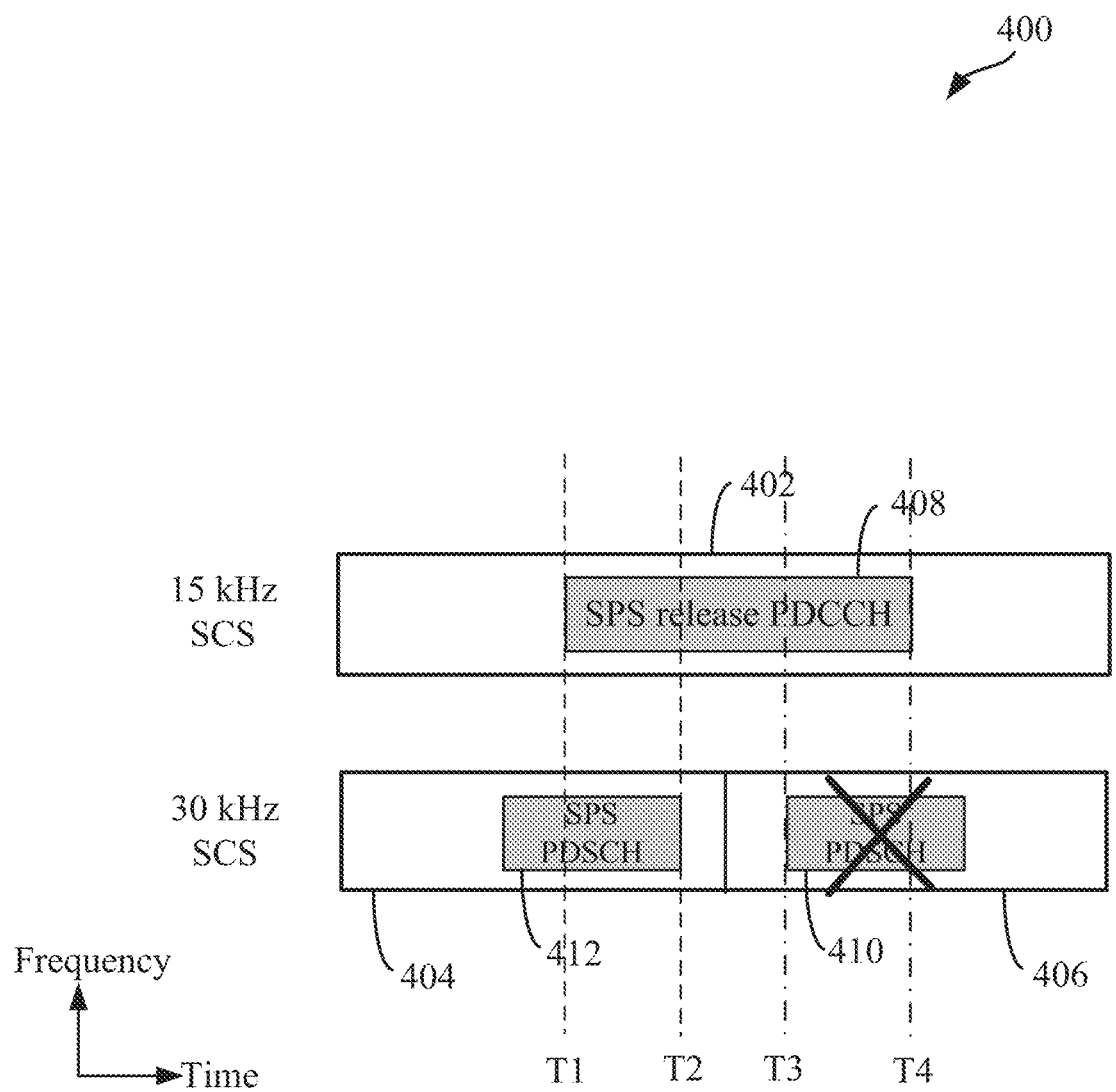
FIG. 4 illustrates example slot structures showing the separate release of semi-persistent scheduling (SPS) configuration for multiple physical downlink shared channel (PDSCH) transmission occasions, according to some aspects of the present disclosure.
Figure 5:
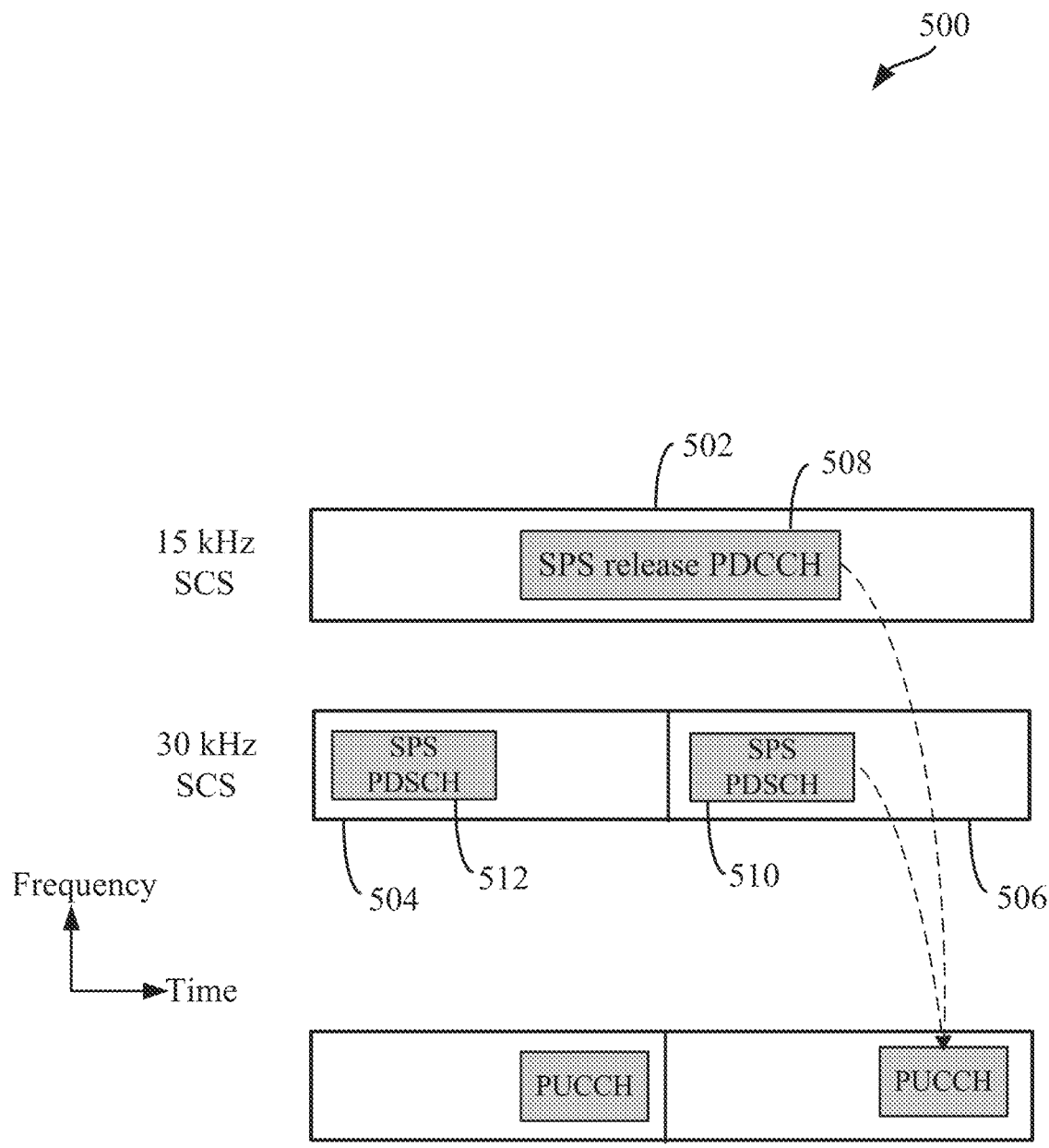
FIG. 5 illustrates example slot structures showing the separate release of semi-persistent scheduling (SPS) configuration for multiple physical downlink shared channel (PDSCH) transmission occasions, according to some aspects of the present disclosure.

FIGS. 3-5 illustrate example slot structures showing the separate release of semi-persistent scheduling (SPS) configurations for multiple physical downlink shared channel (PDSCH) transmissions, according to some aspects of the present disclosure. In some aspects, in NR, a UE may be configured to support multiple numerologies with subcarrier spacing (SCS) determined by the equation $\Delta f = 2^\mu \times 15$ kHz, where the spacing parameter $\mu=0, 1, 2, 3, 4$. In some aspects, the number of subframes within a radio frame structure can remain the same across different subcarrier spacing, and as such, the length of a slot in a subframe can be different depending on the SCS. FIG. 3 shows an example schematic illustration showing different slot sizes or lengths for different SCSs, i.e., slot 302 of 15 kHz SCS having a larger slot length compared to slot 304 (or slot 306) of 30 kHz SCS. In other words, there may be more slots in a subframe of a larger SCS compared to the number of slots for a lower SCS. For example, a 15 kHz SCS would result in a millisecond long slot, i.e., slot 302, which could also constitute an entire 1 ms subframe. The 30 kHz SCS would result in 2 slots having a duration of ½ or 0.5 ms in the 1 ms subframe, i.e., there would be two slots 304 and 306 within the 1 ms subframe. Although 15 kHz and 30 kHz SCSs are shown in FIG. 3 for example comparison purposes, it is to be understood that the same discussion about slots having different lengths may apply to any two different SCSs, with the slot of the lower SCS being longer than the slot of the higher SCS (and more slots of the higher SCS fitting in the subframe compared to those of the lower SCS). In other words, slot length and number of slots per subframe can be numerology dependent while length of a subframe is numerology independent (and set at 1 ms).

In some aspects, a BS (e.g., gNB) may transmit via PDCCH a SPS release (e.g., DCI) configured to release a SPS configuration that is activated or configured for scheduling multiple PDSCH transmission occasions to a UE via PDSCH. In some cases, the SPS release (alternatively referred herein as "SPS release PDCCH") may be configured for transmission over a PDCCH in a slot of a radio frame structure with a first numerology and the SPS configured PDSCH transmission occasions (alternatively referred herein as "SPS PDSCH") may be configured for transmission over a PDSCH in a slot or slots of a radio frame structure with a second numerology that is different from the first numerology. For example, the first numerology may have a spacing parameter $\mu_{PDCCH}$ that is less than the spacing parameter of the second numerology $\mu_{PDSCH}$, and as a result the slot for the PDCCH may be longer than the slot for the PDSCH. However, there can be more slots of the radio frame structure with the second numerology such that the total length of these slots is equal to the length of the slot of the radio frame structure with the first numerology. For example, the slots of the radio frame structure with the second numerology (e.g., having the PDSCH), such as 304 and 306 may coincide or align in time with the slot of the radio frame structure with the first numerology (e.g., having the PDCCH), such as slot 302. Further, the length of slot 302 may be equal to the total length of slots 304 and 306.

In some aspects, the SPS release PDCCH transmitted to the UE to release the SPS configuration that schedules multiple PDSCH transmission occasions may include the configuration index of the configuration that is to be released by the SPS release PDCCH. For example, the SPS release PDCCH may be a DCI having a HPN indicating the SPS configuration index of the SPS configuration to be released by the SPS PDCCH (e.g., DCI). With reference to FIG. 3, the SPS release PDCCH 308 may include the SPS configuration index of the SPS configuration that schedules the SPS configured PDSCH transmission occasions 310 and 312, indicating to the UE that the release would affect data transmission via the SPS configured PDSCH transmission occasions 310 and 312. In some instances, the multiple PDSCH transmission occasions may correspond to repetitions of the same transport block (TB) transmitted using the SPS configuration. That is, in some cases, there may be multiple PDSCH transmission occasions where at least some of which correspond to different transport blocks scheduled using the SPS configuration, while in some other cases, the multiple PDSCH transmission occasions may correspond to the same transport block that is repeatedly transmitted using the SPS configuration (e.g., scheduled by the SPS configuration).

In some aspects, to release the SPS configuration that schedules the SPS configured PDSCH transmission occasions 310 and 312, the BS (e.g., gNB) may transmit the SPS release PDCCH 308 in the slot 302 that coincides or aligns with the slots 304 and 306 of the SPS configured PDSCH transmission occasions 310 and 312. In some aspects, the SPS release PDCCH 308 may overlap in time with the SPS configured transmission occasions 310 and 312. That is, as shown, the SPS release PDCCH 308 may overlap with SPS PDSCH 312 between time T1 and T2 and with SPS configured PDSCH transmission occasion 310 between T3 and T4. In some respects, the SPS release PDCCH may release the SPS configuration of the SPS configured PDSCH transmission occasions (e.g., 310 and 312) when the SPS release PDCCH 308 (e.g., which includes the configuration index of the SPS configuration of the transmission occasions 310 and 312) is received by the UE in a slot 302 that coincides or aligns with the slots 304 and 306 of the SPS configured PDSCH transmission occasions 310 and 312. Further, the SPS release PDCCH may release the SPS configuration of the SPS configured PDSCH transmission occasions (e.g., 310 and 312) when the SPS release PDCCH 308 overlaps in time with the SPS configured PDSCH transmission occasions 310 and 312. In some instances, the UE may (or shall) check the SPS PDSCH slots that overlap with the SPS PDCCH (e.g., overlaps with the PDCCH slot). For example, the UE may or shall check the slots 304 and 306 of the SPS configured PDSCH transmission occasions 310 and 312 that overlap with the SPS release PDCCH 308 (e.g., and/or the slot 302 via which the SPS release PDCCH 308 is transmitted).

In some aspects, there may be different scenarios as to whether the UE receives data on one or more of the SPS configured PDSCH transmission occasions 310 and 312 that overlap in time with the SPS release PDCCH 308. In some aspects, FIG. 3 shows a scenario where no SPS PDSCH data transmission may be received at the UE via any of the SPS configured PDSCH transmission occasions 310 and 312, as indicated by the "X" marks. In some aspects, the any of the SPS configured PDSCH transmission occasions 310 and 312 may overlap in time with the SPS release PDCCH 308. In other words, when a UE receives a SPS release PDCCH including a configuration index of a SPS configuration that schedules multiple PDSCH transmission occasions, the UE may not or does not expect to receive data via any of these SPS configured PDSCH transmission occasions (e.g., the UE may refrain from receiving the data, or if the data arrives, the transmission may be treated as error because the UE may not be expecting to receive any data). In some cases, when a UE receives a SPS release PDCCH including a configuration index of a SPS configuration that schedules multiple PDSCH transmission occasions, and the SPS release PDCCH overlaps with the multiple PDSCH transmission occasions in time, the UE may not or does not expect to receive data via any of these SPS configured PDSCH transmission occasions (e.g., the UE may refrain from receiving the data, or if the data arrives, the transmission may be treated as error because the UE may not be expecting to receive any data).

In some aspects, the UE may not or does not expect to receive SPS PDSCH or data on the last SPS configured PDSCH transmission occasion to be configured by the configuration having the configuration index included in the SPS release PDCCH (e.g., the UE may refrain from receiving the SPS PDSCH or data, or may treat the SPS PDSCH or data as error if the SPS PDSCH or data arrives). Further, such last SPS configured PDSCH transmission occasion may overlap with the SPS release PDCCH and the UE may not or does not expect to receive SPS PDSCH or data on this last SPS configured PDSCH transmission occasion overlapping with the SPS release PDCCH (e.g., the UE may refrain from receiving the SPS PDSCH or data, or may treat the SPS PDSCH or data as error if the SPS PDSCH or data arrives). This scenario is schematically depicted in FIG. 4, where no data transmission may be received at the UE, i.e., the BS refrains from transmitting data transmission to the UE, via the last SPS configured PDSCH transmission occasion 410 that overlaps with the SPS release PDCCH 408 that includes the configuration index of the SPS configuration that configured or scheduled the SPS configured PDSCH transmission occasion 410, as indicated by the "X" mark. Because the UE may not be expecting SPS PDSCH data to arrive via the last SPS configured PDSCH transmission occasion 410, such transmission may be treated as error by the UE. Further, as shown in FIG. 4, the last SPS configured PDSCH transmission occasion 410 may terminate after the termination of the SPS release PDCCH 408.

In some aspects, as shown in FIG. 5, the HARQ ACK/NACK for the SPS release PDCCH 508 and the last SPS configured PDSCH transmission occasion 510 (e.g., that overlaps in time with the SPS release PDCCH 508 and is configured with the SPS configuration having the SPS configuration index included in the SPS release PDCCH 508) may be mapped to the same HARQ-ACK codebook and same slot on PUCCH. In other words, the UE may place the HARQ ACK/NACK for the SPS release PDCCH 508 at the PUCCH location or slot that corresponds to the PUCCH location or slot, according to the HARQ-ACK codebook, of the released SPS configured PDSCH transmission occasion 510. In such cases, the UE may generate only one HARQ-ACK bit that is associated with the TDRA of the last SPS configured PDSCH transmission occasion 510. For example, the HARQ-ACK bit location can be derived based on the TDRA of the last SPS configured PDSCH transmission occasion 510. In some cases, the one-bit HARQ ACK/NACK may indicate whether the UE detects or fails to detect, respectively, the SPS release PDCCH 508.

As noted above, in some instances, the UE may (or shall) check the SPS PDSCH slots that overlap with the SPS PDCCH (e.g., overlaps with the PDCCH slot). For example, the UE may or shall check the slots 504 and 506 of the SPS configured PDSCH transmission occasions 512 and 510 that overlap with the SPS release PDCCH 508 (e.g., and/or the slot 502 via which the SPS release PDCCH 508 is transmitted). In such cases, the UE may not expect to receive or may not receive any of the SPS PDSCHs that occur in or after the SPS PDSCH slots that overlap the SPS release PDCCH (e.g., and/or the SPS release PDCCH slots). For example, with reference to FIG. 5, the UE may not expect to receive or may not receive PDSCH transmissions via the SPS configured PDSCH transmission occasions 512 and 510 in the SPS PDSCH slots 504 and 506 that overlap with the SPS release PDCCH 508 (e.g., and/or the SPS release PDCCH slot 502 via which the SPS release PDCCH 508 is transmitted). Further, the UE may not expect to receive or may not receive (e.g., refrain from receiving) PDSCH transmissions via the SPS configured PDSCH transmission occasions occurring after the SPS PDSCH slots 504 and 506 that overlap with the SPS release PDCCH 508 (e.g., and/or the SPS release PDCCH slot 502 via which the SPS release PDCCH 508 is transmitted). In addition, in some instances, the UE may not generate HARQ-ACK/NACKs for said PDSCH transmissions via the SPS configured PDSCH transmission occasions occurring in or after slots overlapping with the SPS release PDCCH (e.g., and/or the slot via which the SPS release PDCCH is transmitted). For example, the UE may not generate HARQ-ACK/NACKs for PDSCH transmissions via the SPS configured PDSCH transmission occasions 512 and 510 in the SPS PDSCH slots 504 and 506 that overlap with the SPS release PDCCH 508 (e.g., and/or the SPS release PDCCH slot 502 via which the SPS release PDCCH 508 is transmitted).

In some aspects, as noted above, the UE may (or shall) check the SPS PDSCH slots that overlap with the SPS release PDCCH (e.g., overlaps with the PDCCH slot). In some instances, the UE may or shall expect that the SPS release PDCCH may be received or shall be received prior to the ending or last symbol of the earliest SPS configured PDSCH transmission occasion or SPS PDSCH occurring in the SPS PDSCH slots (e.g., that are overlapping with the SPS release PDCCH and/or the SPS release PDCCH slot via which the SPS release PDCCH is transmitted).

In some aspects, the UE does not or may not expect that the HARQ-ACK/NACK corresponding to the SPS release PDCCH is scheduled in a different uplink slot or subslot as the HARQ-ACK/NACK for the SPS PDSCH that occurs in the first overlapping slot (e.g., the SPS PDSCH slot for the SPS configured PDSCH transmission occasions that is overlapping with the SPS release PDCCH or slot for the SPS release PDCCH). In some aspects, the UE does not or may not expect that the HARQ-ACK/NACK corresponding to the SPS release PDCCH is scheduled in a different uplink slot or subslot as the HARQ-ACK/NACK for the SPS PDSCH that occurs in the last overlapping slot (e.g., the SPS PDSCH slot for the SPS configured PDSCH transmission occasions that is overlapping with the SPS release PDCCH or slot for the SPS release PDCCH). In some aspects, the UE does not or may not expect that the HARQ-ACK/NACK corresponding to the SPS release PDCCH is scheduled in a different uplink slot or subslot as the HARQ-ACK/NACK for any of the SPS PDSCHs that occur in the overlapping slots (e.g., the SPS PDSCH slots for the SPS configured PDSCH transmission occasions that are overlapping with the SPS release PDCCH or slot for the SPS release PDCCH).

In some aspects, the SPS release may end prior to an end of any of the multiple SPS PDSCH transmission occasions. For example, with reference to scenarios such as those shown in FIGS. 3-5, in some cases, the SPS release PDCCH may end or terminate before any of the multiple or plurality of PDSCH transmission occasions that may be scheduled by the SPS configuration which is to be released by the SPS release PDCCH. That is, to release the SPS configuration that schedules the SPS configured PDSCH transmission occasions, the BS (e.g., gNB) may transmit the SPS release PDCCH such that the SPS release PDCCH may end or terminate before any of the SPS configured PDSCH transmission occasions. For example, the UE may receive a PDCCH providing the DCI format (e.g., SPS release PDCCH) in the slot where the end of a last symbol of the PDCCH reception is not after the end of a last symbol of any of the SPS PDSCH receptions (i.e., the SPS PDSCH occasions).

Figure 6:
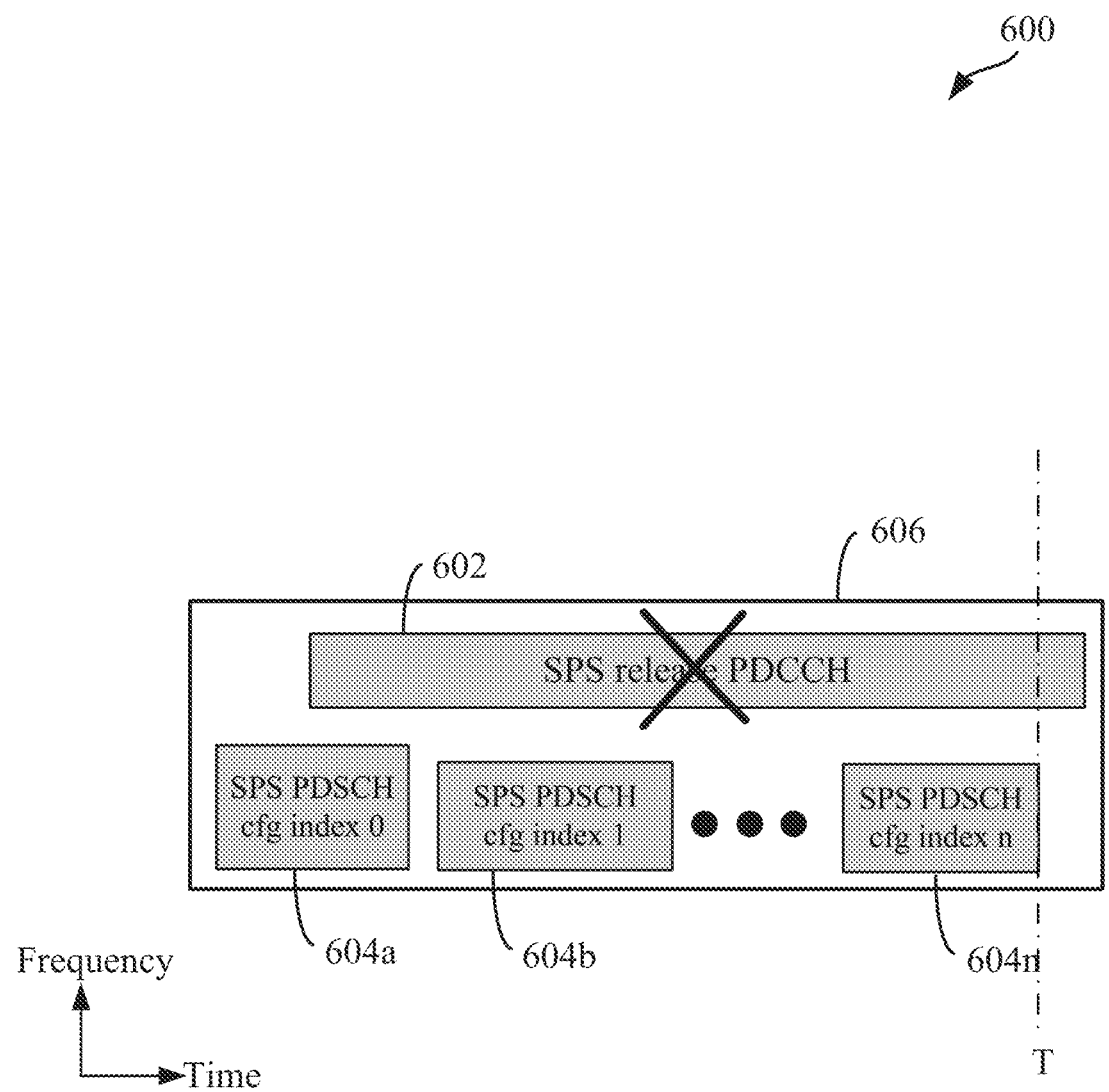
FIG. 6 illustrates example slot structures showing the joint release of semi-persistent scheduling (SPS) configurations for multiple physical downlink shared channel (PDSCH) transmission occasions, according to some aspects of the present disclosure.

FIGS. 6-12 illustrate example slot structures showing the joint release of semi-persistent scheduling (SPS) configurations for multiple physical downlink shared channel (PDSCH) transmissions, according to some aspects of the present disclosure. In some aspects, the base station may activate multiple SPS configurations with separate activation DCIs indicating different SPS configuration indices for the multiple SPS configurations. For example, the HPN field in each activation (or reactivation) DCI may include a configuration index for the respective SPS configuration being activated or reactivated by the DCI. In such cases, there can be multiple PDSCH transmission occasions in the same slot configured by SPS configurations that have different SPS configuration indices. FIG. 6 shows an example schematic illustration of a slot 606 having multiple SPS configured PDSCH transmission occasions 604*a*, 604*b*, . . . , 604*n* each with a different configuration index.

In some aspects, to jointly release the multiple SPS configurations that configured or scheduled the multiple SPS configured PDSCH transmission occasions 604*a*, 604*b*, . . . , 604*n*, the BS (e.g., gNB) may transmit via PDCCH, on the same slot as the slot of the multiple SPS configured PDSCH transmission occasions 604*a*, 604*b*, . . . , 604*n*, a SPS release (e.g., DCI) indicating the configuration indices of the multiple SPS configurations to be released by the SPS release PDCCH. In some aspects, the SPS release PDCCH may overlap in time with some or all of the multiple SPS configured PDSCH transmission occasions 604*a*, 604*b*, . . . , 604*n*. In some aspects, there can be different scenarios that the UE expects related to the overlap, in time, of the SPS release PDCCH with the multiple SPS configured PDSCH transmission occasions 604*a*, 604*b*, . . . , 604*n* that result in the joint release of the multiple SPS configurations of the SPS configured PDSCH transmission occasions 604*a*, 604*b*, . . . , 604*n*. In some aspects, there can be different scenarios that the UE expects related to the timings associated with the reception at the UE of the SPS release PDCCH and the SPS configured PDSCH transmission occasions 604*a*, 604*b*, . . . , 604*n*.

In some aspects, FIG. 6 shows a scenario where the UE may not or does not expect the received SPS release PDCCH 602 to terminate after termination, at time T, of the last SPS configured PDSCH transmission occasion 604*n* that have a configuration index indicated by the SPS release PDCCH 602, as indicated by the "X" mark. That is, the UE does not expect the SPS release PDCCH 602 that is configured to jointly release the multiple SPS configurations of the PDSCH transmission occasions 604*a*, 604*b*, . . . , 604*n*, and including the configuration indices thereof, to terminate after the end of the last SPS configured PDSCH transmission occasion 604*n* with the configuration index included in the SPS release PDSCH 602. In some aspects, the received SPS release PDCCH 602 may overlap with the SPS configured PDSCH transmission occasion 604*n*. That is, the UE may not or does not expect the received SPS release PDCCH 602 to terminate after termination, at time T, of the SPS configured PDSCH transmission occasion 604*n* that overlaps with the received SPS release PDCCH 602, as indicated by the "X" mark. In some cases, the multiple SPS configurations of the PDSCH transmission occasions may be jointly released by a SPS release PDCCH that terminates prior to the end or termination of the last PDSCH transmission occasion of these PDSCH transmission occasions, where the SPS release PDCCH includes the configuration indices of the PDSCH transmission occasions being jointly released by the SPS release PDCCH. In some cases, the last SPS configured PDSCH transmission occasion 604*n* may overlap with the SPS release PDCCH 602, as shown in FIG. 6, or may not overlap.

Figure 7:
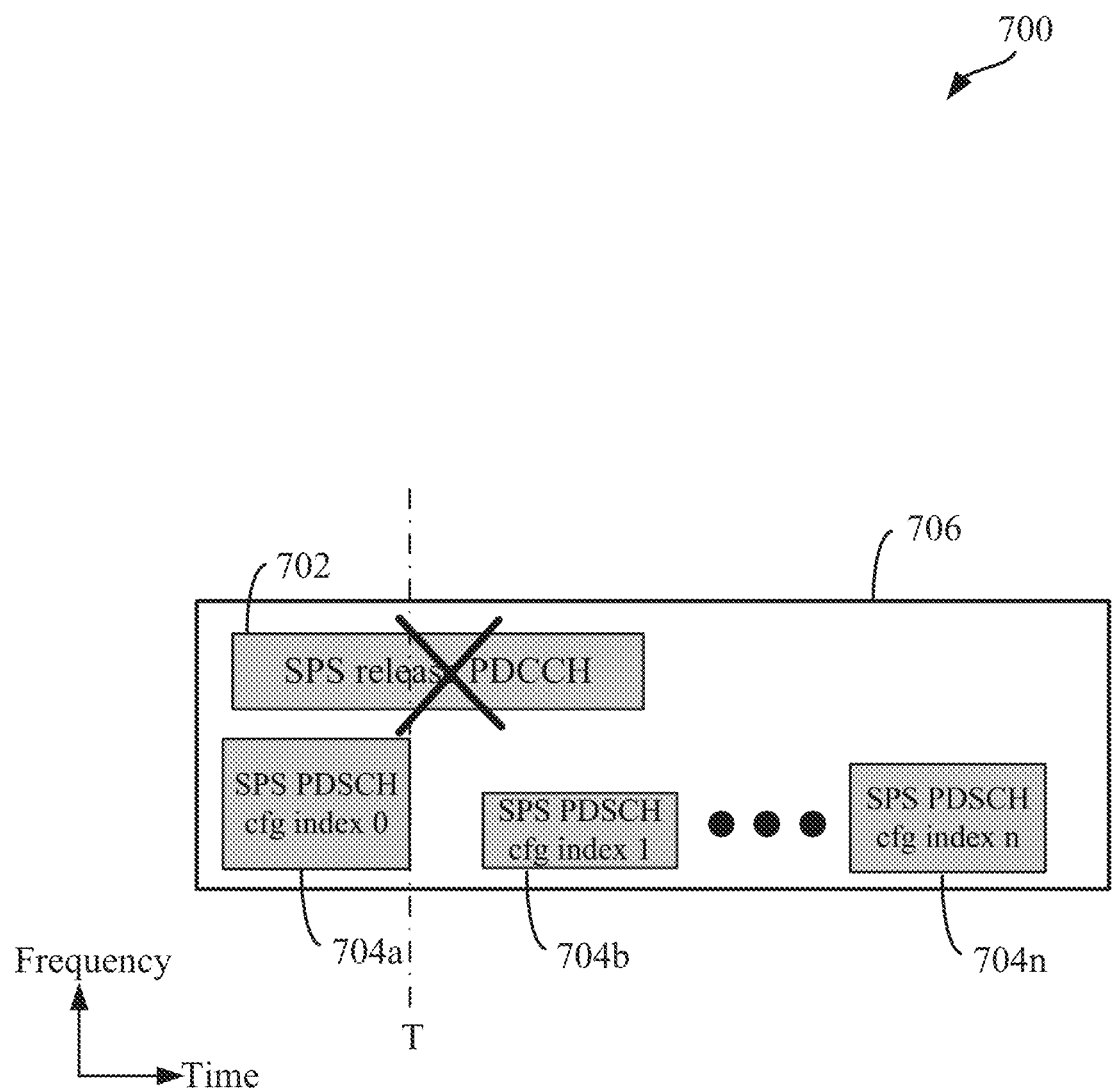
FIG. 7 illustrates example slot structures showing the joint release of semi-persistent scheduling (SPS) configurations for multiple physical downlink shared channel (PDSCH) transmission occasions, according to some aspects of the present disclosure.

In some aspects, FIG. 7 shows another scenario where the UE may not or does not expect the received SPS release PDCCH 702 to terminate after the termination, at time T, of the first SPS configured PDSCH transmission occasion 704*a* that have a configuration index indicated by the SPS release PDCCH 702, as indicated by the "X" mark. That is, the UE does not expect the SPS release PDCCH 702 that is configured to jointly release the multiple SPS configurations of the PDSCH transmission occasions 704*a*, 704*b*, . . . , 704*n*, and including the configuration indices thereof, to terminate after the end of the first SPS configured PDSCH transmission occasion 704*a* with the configuration index included in the SPS release PDSCH 702. In some aspects, the UE may not or does not expect the received SPS release PDCCH 702 to terminate after the termination, at time T, of the first SPS configured PDSCH transmission occasion 704*a* overlapping with the SPS release PDCCH 702 and having a configuration index indicated by the SPS release PDCCH 702, as indicated by the "X" mark. In such cases, the multiple SPS configurations of the PDSCH transmission occasions in a given slot (e.g., 706) may be jointly released by a SPS release PDCCH received in the same slot (e.g., 706), where the SPS release PDCCH terminates prior to the end or termination of the first PDSCH transmission occasion of these PDSCH transmission occasions, where the SPS release PDCCH includes the configuration indices of the PDSCH transmission occasions being jointly released by the SPS release PDCCH. In some cases, the first SPS configured PDSCH transmission occasion 704*a* may overlap with the SPS release PDCCH 702, as shown in FIG. 7, or may not overlap.

Figure 8:
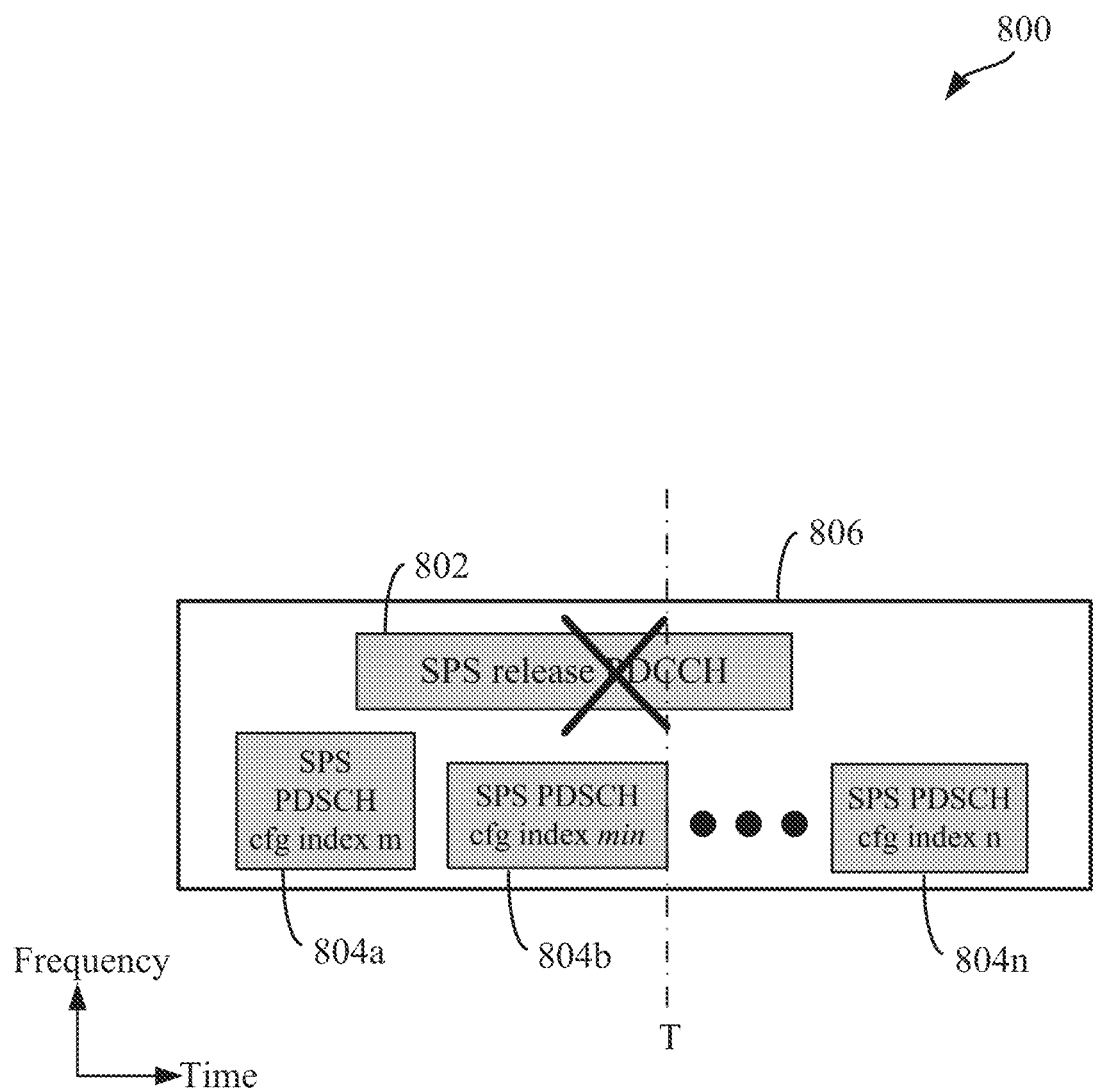
FIG. 8 illustrates example slot structures showing the joint release of semi-persistent scheduling (SPS) configurations for multiple physical downlink shared channel (PDSCH) transmission occasions, according to some aspects of the present disclosure.

In some aspects, FIG. 8 shows another scenario where the UE may not or does not expect the received SPS release PDCCH 802 to terminate after termination, at time T, of the SPS configured PDSCH transmission occasion 804b with the lowest configuration index indicated by the SPS release PDCCH 802, as indicated by the "X" mark. That is, the UE does not expect the SPS release PDCCH 802 that is configured to jointly release the multiple SPS configurations of the PDSCH transmission occasions 804a, 804b, . . . , 804n, and including the configuration indices thereof, to terminate after the end of the SPS configured PDSCH transmission occasion 804b with the lowest configuration index of the configuration indices included in the SPS release PDSCH 802. In such cases, the multiple SPS configurations of the PDSCH transmission occasions in a given slot (e.g., 806) may be jointly released by a SPS release PDCCH received in the same slot (e.g., 806), where the SPS release PDCCH terminates prior to the end or termination of the PDSCH transmission occasion of these PDSCH transmission occasions that has the lowest configuration index of the configuration indices included in the SPS release PDCCH to be jointly released by the SPS release PDCCH.

Figure 9:
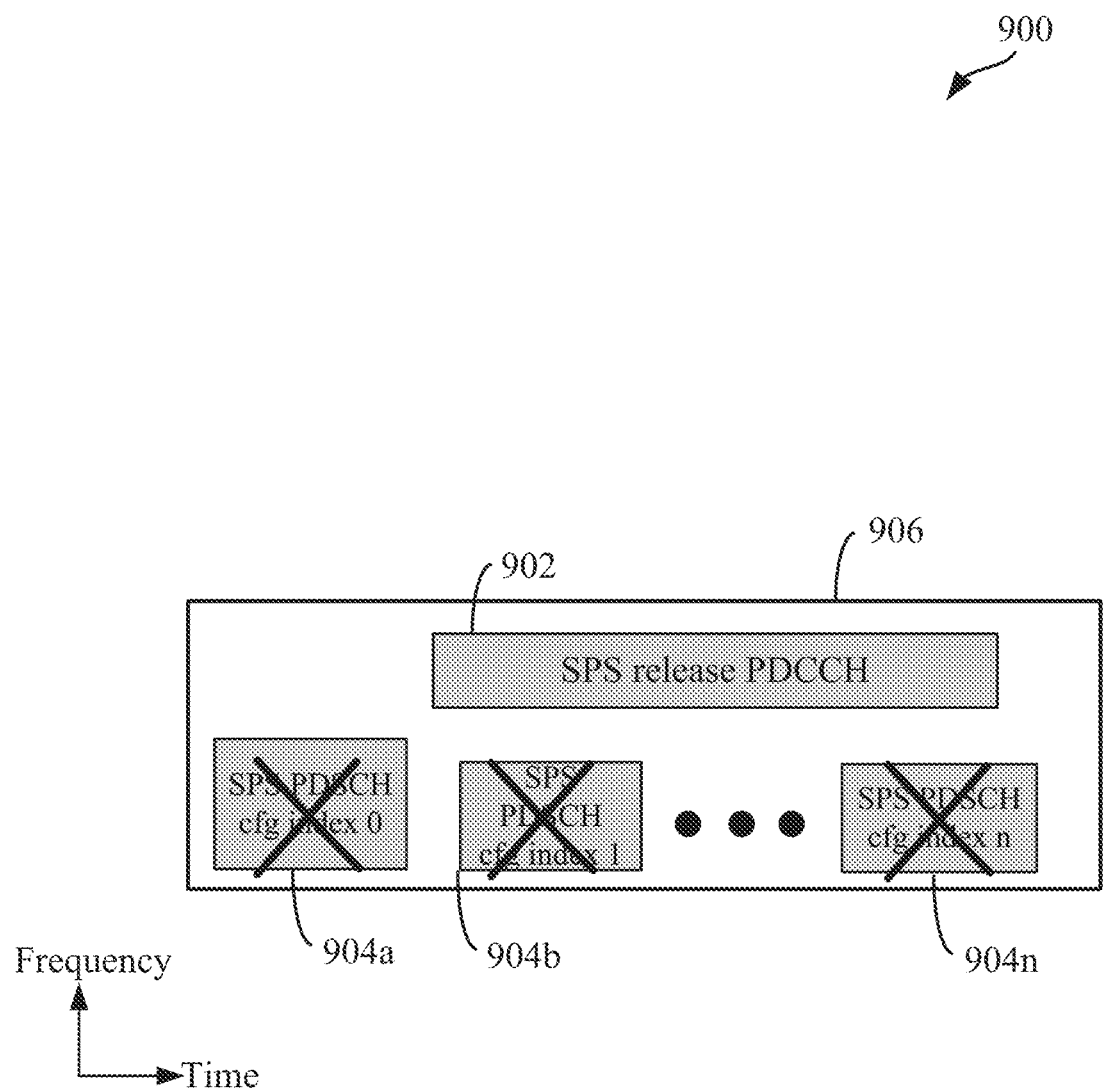
FIG. 9 illustrates example slot structures showing the joint release of semi-persistent scheduling (SPS) configurations for multiple physical downlink shared channel (PDSCH) transmission occasions, according to some aspects of the present disclosure.

In some aspects, that is, when multiple SPS configurations are released jointly by a SPS release PDCCH (e.g., a single DCI indicating the configuration indices of the multiple configurations to be release by the release DCI), there can be different scenarios as to whether the UE receives data on one or more of the SPS configured PDSCH transmission occasions configured or scheduled by the multiple SPS configurations. For example, in some aspects, FIG. 9 shows a scenario where no SPS PDSCH data transmission may be received at the UE via any of the SPS configured PDSCH transmission occasions 904a, 904b, . . . , 904n configured for transmission in the same slot 906 as the one in which the SPS release PDCCH 902 occurs, as indicated by the "X" marks. In other words, when a UE receives, at a given slot, a SPS release PDCCH including configuration indices of SPS configurations that (i) configure or schedule multiple PDSCH transmission occasions at the same slot and (ii) are to be jointly released by the SPS release PDCCH, the UE may not or does not expect to receive data or SPS PDSCH via any of these SPS configured PDSCH transmission occasions (e.g., the UE may refrain from receiving the data or SPS PDSCH, or may treat the data or SPS PDSCH as error if the data or SPS PDSCH or data arrives, because the UE may not be expecting to receive any data).

Figure 10:
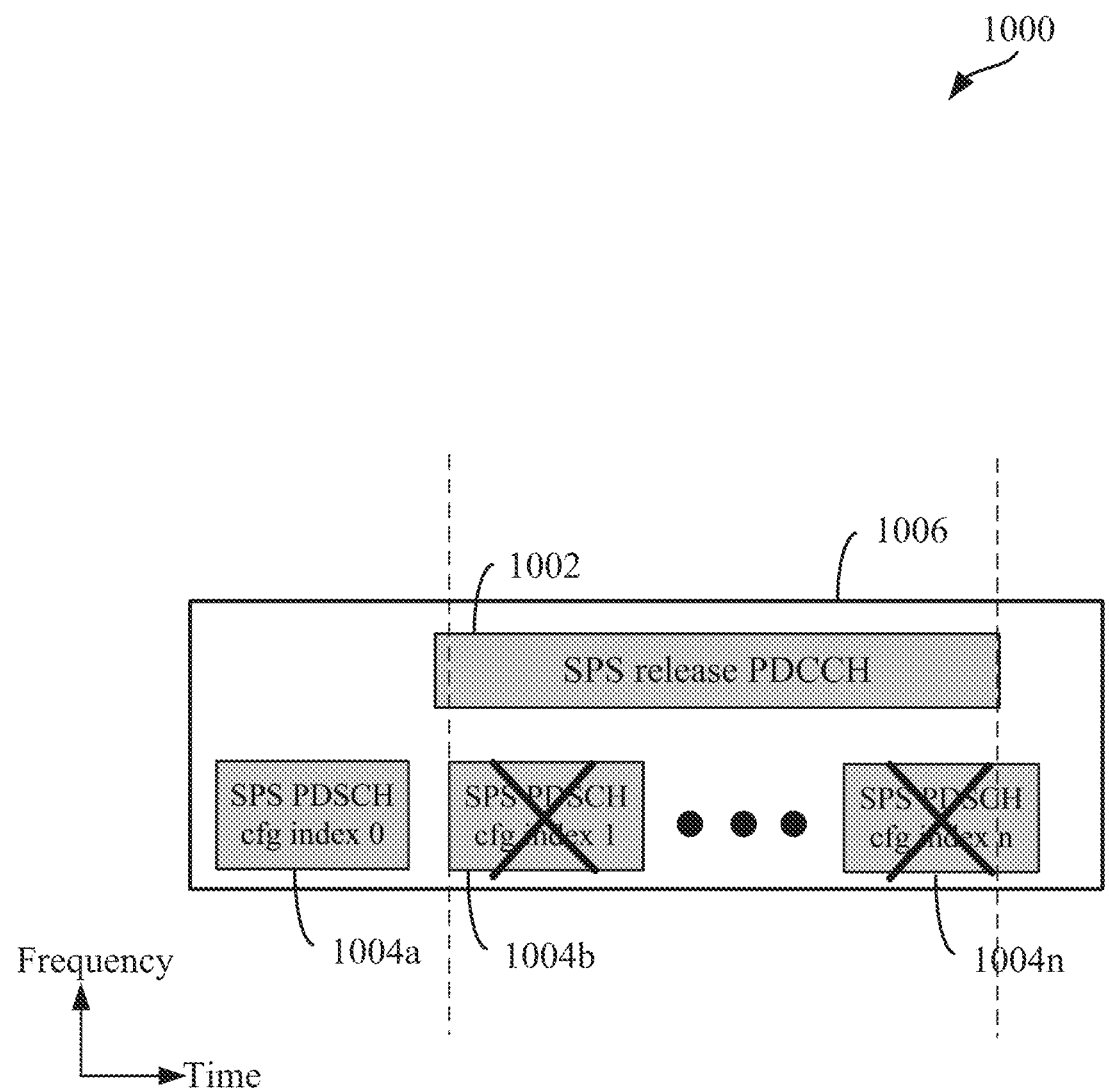
FIG. 10 illustrates example slot structures showing the joint release of semi-persistent scheduling (SPS) configurations for multiple physical downlink shared channel (PDSCH) transmission occasions, according to some aspects of the present disclosure.

In some aspects, FIG. 10 shows another scenario where no SPS PDSCH data transmission may be received at the UE via the SPS configured PDSCH transmission occasions 1004b, . . . , 1004n that overlap in time with the SPS release PDCCH 1002 and are configured for transmission in the same slot 1006 as the one in which the SPS release PDCCH 1002 is received, as indicated by the "X" marks over the SPS configured PDSCH transmission occasions 1004b, . . . , 1004n that overlap in time with the SPS release PDCCH 1002. In other words, when a UE receives, at a given slot, a SPS release PDCCH including configuration indices of SPS configurations that (i) configure or schedule multiple PDSCH transmission occasions at the same given slot and (ii) are to be jointly released by the SPS release PDCCH, the UE may not or does not expect to receive data or SPS PDSCH via the SPS configured PDSCH transmission occasions that overlap in time with the SPS release PDCCH 1002 (e.g., the UE may refrain from receiving the data or SPS PDSCH, or may treat the data or SPS PDSCH as error if the data or SPS PDSCH or data arrives, because the UE may not be expecting to receive any data).

Figure 11:
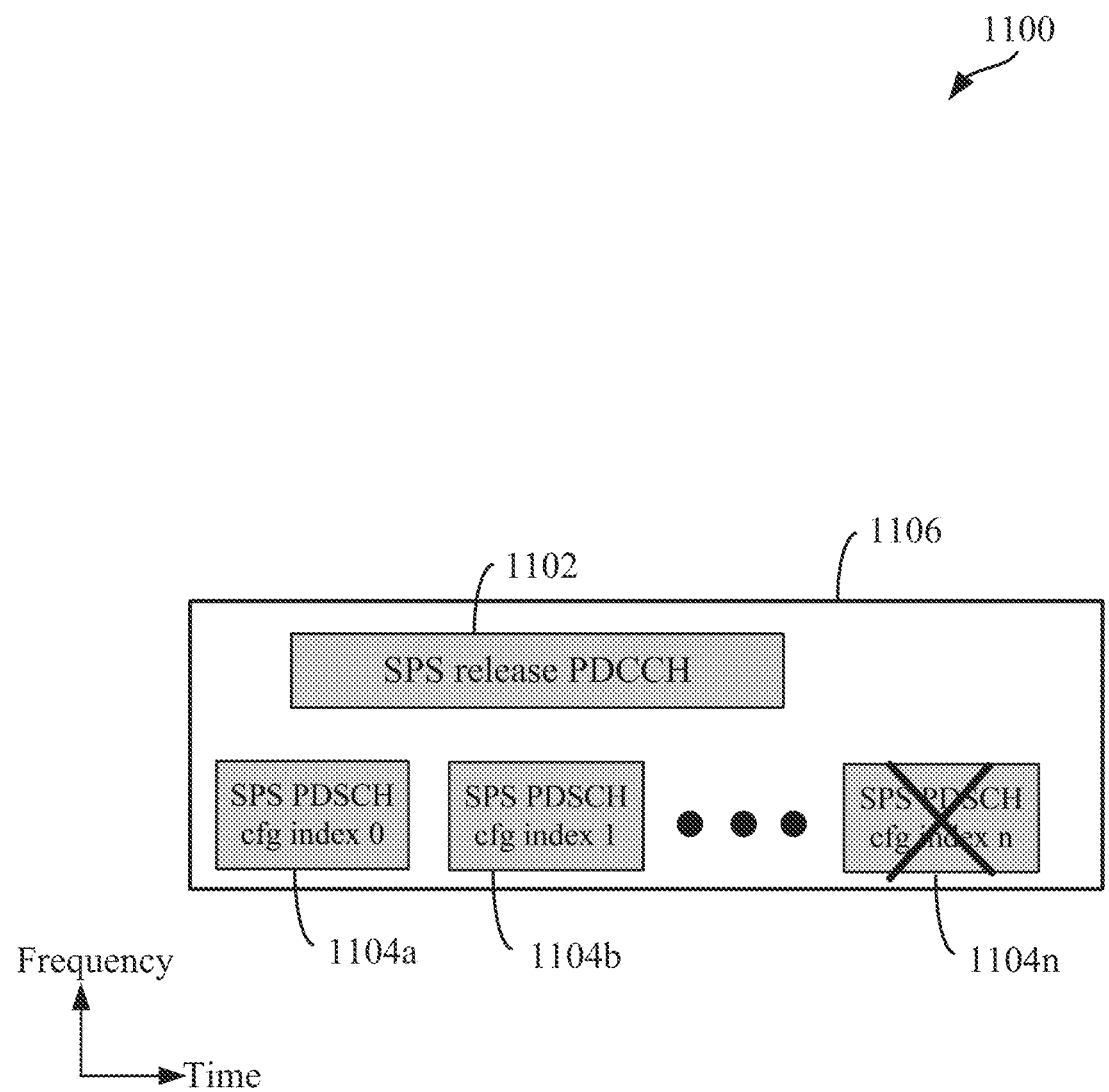
FIG. 11 illustrates example slot structures showing the joint release of semi-persistent scheduling (SPS) configurations for multiple physical downlink shared channel (PDSCH) transmission occasions, according to some aspects of the present disclosure.

In some aspects, FIG. 11 shows another scenario where no SPS PDSCH data transmission may be received at the UE via the SPS configured PDSCH transmission occasion(s) 1104n at slot 1106 that terminate after the termination of the SPS release PDCCH 1102, as indicated by the "X" mark over SPS PDSCH transmission occasion 1104n. In other words, when a UE receives, at a given slot, a SPS release PDCCH including configuration indices of SPS configurations that (i) configure or schedule multiple PDSCH transmission occasions at the same given slot and (ii) are to be jointly released by the SPS release PDCCH, the UE may not or does not expect to receive data or SPS PDSCH via the SPS configured PDSCH transmission occasion(s) that terminate after the termination of the SPS release PDCCH 1102 (e.g., the UE may refrain from receiving the data or SPS PDSCH, or may treat the data or SPS PDSCH as error if the data or SPS PDSCH or data arrives, because the UE may not be expecting to receive any data).

Figure 12:
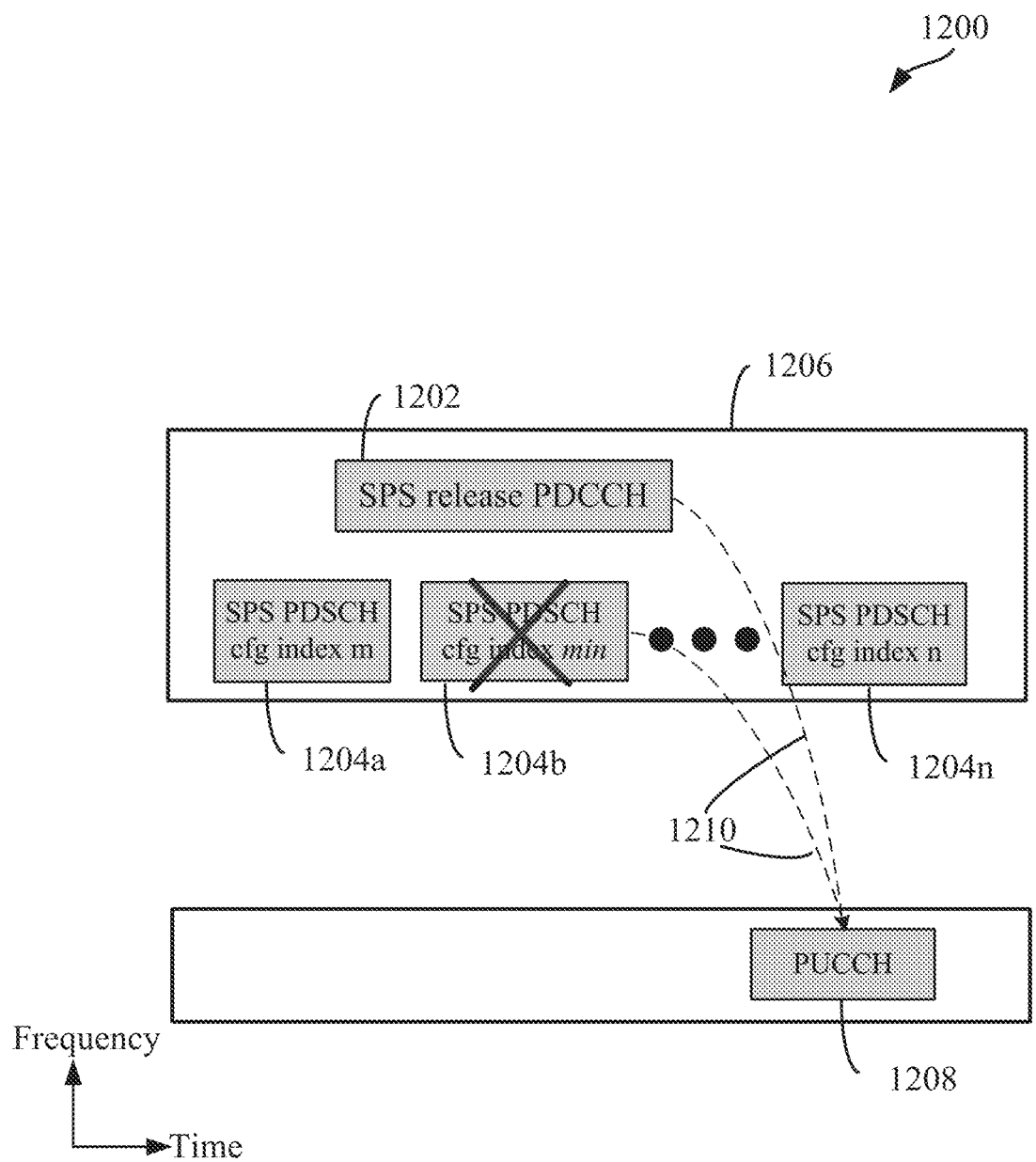
FIG. 12 illustrates example slot structures showing the joint release of semi-persistent scheduling (SPS) configurations for multiple physical downlink shared channel (PDSCH) transmission occasions, according to some aspects of the present disclosure.

In some aspects, FIG. 12 shows yet another scenario where no SPS PDSCH data transmission may be received at the UE via the SPS configured PDSCH transmission occasion 1204b that has the lowest SPS configuration index of the SPS configuration indices of the multiple SPS configurations to be released by the SPS release PDCCH, as indicated by the "X" mark over SPS PDSCH transmission occasion 1204b that has the lowest SPS configuration index. In other words, when a UE receives a SPS release PDCCH including configuration indices of SPS configurations that (i) configure or schedule multiple PDSCH transmission occasions and (ii) are to be jointly released by the SPS release PDCCH, the UE may not or does not expect to receive data or SPS PDSCH via the SPS configured PDSCH transmission occasion with the lowest SPS configuration index (e.g., the UE may refrain from receiving the data or SPS PDSCH, or may treat the data or SPS PDSCH as error if the data or SPS PDSCH or data arrives, because the UE may not be expecting to receive any data). In some aspects, the UE is configured to receive (a) the SPS release PDCCH 1202 and (b) the SPS configured PDSCH transmission occasion with the lowest SPS configuration index 1204b, in the same slot (e.g., 1206). Further, the UE may not or does not expect to receive data or SPS SDSCH via the SPS configured PDSCH transmission occasion with the lowest SPS configuration index 1204b if the HARQ ACK/NACK for the SPS release PDCCH 1202 and PDSCH transmission occasion with the lowest SPS configuration index 1204b may be mapped 1210 to the same PUCCH 1208 or may be transmitted in the same slot. In other words, the UE may not or does not expect to receive data or SPS SDSCH via the SPS configured PDSCH transmission occasion with the lowest SPS configuration index 1204b if the UE is configured to place the HARQ ACK/NACK for the SPS release PDCCH 1202 at the PUCCH location or slot that corresponds to the PUCCH location or slot of the released SPS configured PDSCH transmission occasion with the lowest SPS configuration index 1204b.

In some aspects, no SPS PDSCH data transmission may be received at the UE under one or more of the scenarios discussed with reference to FIGS. 9, 10, 11 and/or 12. That is, no SPS PDSCH data transmission may be received at the UE via one or more of: (i) any of the SPS configured PDSCH transmission occasions configured for transmission in the same slot as the one in which the SPS release PDCCH occurs, where the multiple SPS configurations configuring the PDSCH transmission occasions are to be jointly released by the SPS release PDCCH; (ii) the SPS configured PDSCH transmission occasions that overlap in time with the SPS release PDCCH and are configured for transmission in the same slot as the one in which the SPS release PDCCH is received, where the multiple SPS configurations configuring the PDSCH transmission occasions are to be jointly released by the SPS release PDCCH; (iii) the SPS configured PDSCH transmission occasion(s) at a given slot that terminates after the termination of the SPS release PDCCH, where the multiple SPS configurations configuring the PDSCH transmission occasions are to be jointly released by the SPS release PDCCH; and (iv) the SPS configured PDSCH transmission occasion that has the lowest SPS configuration index of the SPS configuration indices of the multiple SPS configurations to be released by the SPS release PDCCH.

In some aspects, when a SPS release PDCCH jointly releases multiple SPS configurations (e.g., via a DCI indicating the configuration indices of the multiple SPS configurations to be released by the DCI), the UE may not or does not expect the HARQ ACK/NACK for the SPS release PDCCH and that of the PDSCH transmission occasion with the lowest SPS configuration index to be mapped to the same PUCCH. That is, the HARQ ACK/NACK for the SPS release PDCCH and that of the PDSCH transmission occasion with the lowest SPS configuration index may not map to the same PUCCH as mentioned above (e.g., the gNB may check that no out-of-order HARQ-ACK occurs). For example, the HARQ-ACK associated with the PDSCH occasion can occur in a slot before the HARQ-ACK associated with the SPS release PDCCH. In such cases, the UE may generate separate HARQ ACK/NACK bits for the SPS release PDCCH and the PDSCH transmission occasion.

In other aspects, when a SPS release PDCCH jointly releases multiple SPS configurations (e.g., via a DCI indicating the configuration indices of the multiple SPS configurations to be released by the DCI), the UE may or does expect the HARQ ACK/NACK for the SPS release PDCCH and that of the PDSCH transmission occasion with the lowest SPS configuration index to be mapped to the same PUCCH. In such cases, the UE may generate only one HARQ-ACK bit if the SPS release PDCCH and the SPS PDSCH transmission occasion with the lowest SPS configuration index are in the same slot. In some cases, the UE may or does not expect to receive any data or SPS PDSCH via the SPS PDSCH transmission occasion. In some cases, the UE may in fact generate separate HARQ-ACK bits HARQ ACK/NACK bits for the SPS release PDCCH and the PDSCH transmission occasion.

Figure 13:
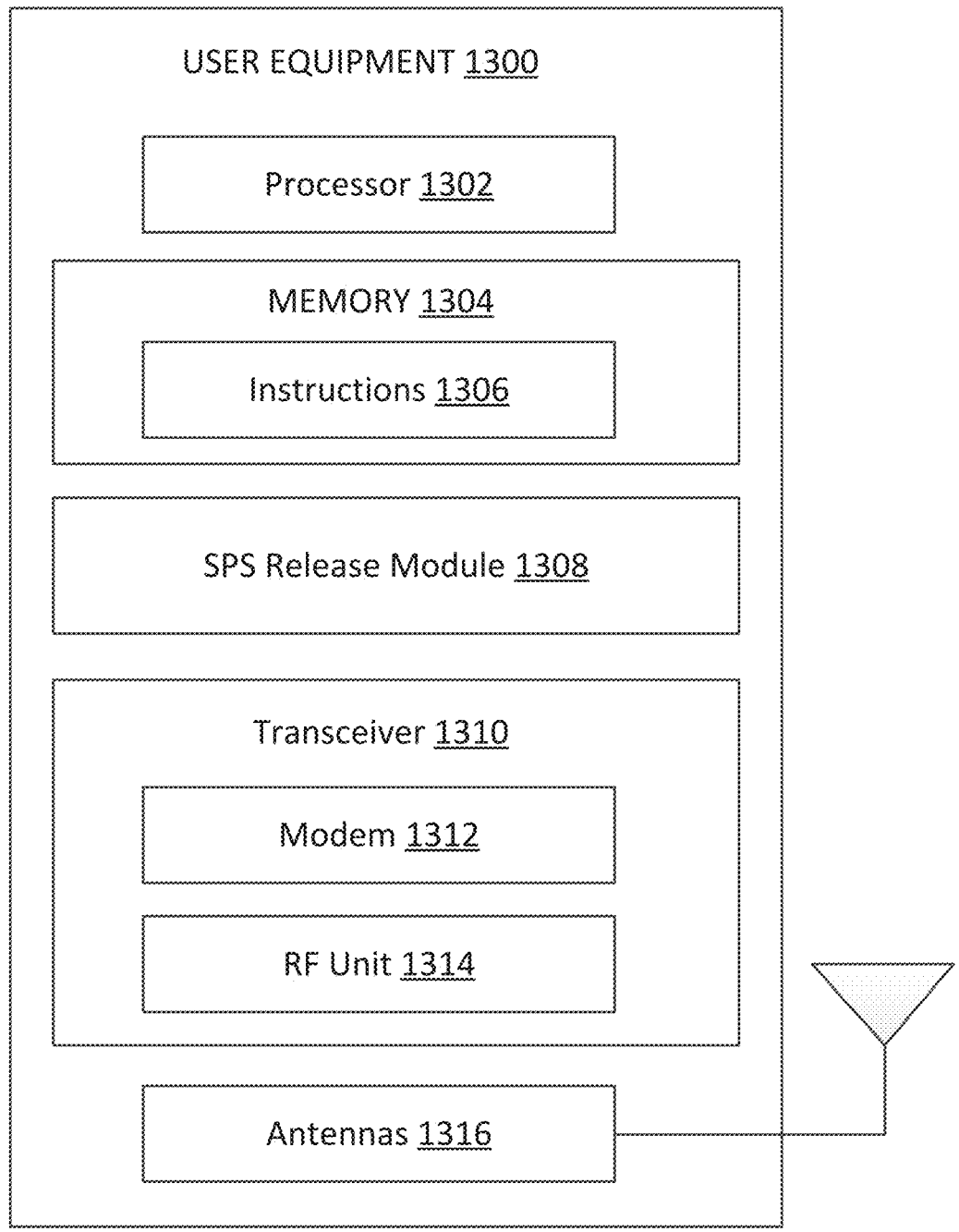
FIG. 13 is a block diagram of a user equipment (UE) according to some aspects of the present disclosure.

FIG. 13 is a block diagram of an exemplary UE 1300 according to some aspects of the present disclosure. The UE 1300 may be a UE 115 in the network 100 as discussed above in FIG. 1 as discussed above in FIG. 1. As shown, the UE 1300 may include a processor 1302, a memory 1304, a SPS release module 1308, a transceiver 1310 including a modem subsystem 1312 and a RF unit 1314, and one or more antennas 1316. These elements may be in direct or indirect communication with each other, for example via one or more buses.

The processor 1302 may have various features as a specific-type processor. For example, these may include a CPU, a DSP, an ASIC, a controller, a FPGA device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1304 may include a non-transitory computer-readable medium. The memory 1304 may store instructions 1306. The instructions 1306 may include instructions that, when executed by the processor 1302, cause the processor 1302 to perform operations described herein, for example, aspects of FIGS. 1-12. Instructions 1306 may also be referred to as program code. The program code may be for causing a wireless communication device to perform these operations, for example by causing one or more processors (such as processor 1302) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SPS release module 1308 may be implemented via hardware, software, or combinations thereof. For example, the SPS release module 1308 may be implemented as a processor, circuit, and/or instructions 1306 stored in the memory 1304 and executed by the processor 1302. In some examples, the SPS release module 1308 can be integrated within the modem subsystem 1312. For example, the SPS release module 1308 can be implemented by a combination of software components (e.g., executed by a DSP or a general processor) and hardware components (e.g., logic gates and circuitry) within the modem subsystem 1312. The SPS release module 1308 may be used for various aspects of the present disclosure, for example, aspects of FIGS. 1-12. The SPS release module 1308 can be configured to receive, from a base station (BS) and via a physical downlink control channel (PDCCH) at a slot of a radio frame structure having a first numerology, a semi-persistent scheduling (SPS) release configured to release at the UE a SPS configuration configured to schedule a plurality of SPS physical downlink shared channel (PDSCH) transmission occasions at multiple slots of a radio frame structure having a second numerology different from the first numerology. In some aspects, each slot of the multiple slots of the radio frame structure having the second numerology can coincide or align with the slot of the radio frame structure having the first numerology. Further, at least a portion of the plurality of SPS PDSCH transmission occasions can overlap in time with the SPS release. The SPS release module 1308 may also be configured to determine, in response to the receiving the SPS release, whether data transmission is received at the UE via at least one of the plurality of SPS PDSCH transmission occasions.

As shown, the transceiver 1310 may include the modem subsystem 1312 and the RF unit 1314. The transceiver 1310 can be configured to communicate bi-directionally with other devices, such as the UEs 115, and/or another core network element. The modem subsystem 1312 may be configured to modulate and/or encode data according to a MCS, e.g., a LDPC coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data (e.g., PSBCH, sidelink RMSI, PSSCH, PSCCH, PSFCH, PC5-RRC configuration, control commands) from the modem subsystem 1312 (on outbound transmissions) or of transmissions originating from another source such as a UE 115.

The RF unit 1314 may be further configured to perform analog beamforming in conjunction with the digital beamforming. Although shown as integrated together in transceiver 1310, the modem subsystem 1312 and/or the RF unit 1314 may be separate devices that are coupled together at a UE 115 to enable the UE 115 to communicate with other devices.

The RF unit 1314 may provide the modulated and/or processed data, e.g. data packets (or, more generally, data messages that may contain one or more data packets and other information), to the antennas 1316 for transmission to one or more other devices. This may include, for example, transmission of information to complete attachment to a network and communication with a camped UE 115 according to some aspects of the present disclosure. The antennas 1316 may further receive data messages transmitted from other devices and provide the received data messages for processing and/or demodulation at the transceiver 1310. The transceiver 1310 may provide the demodulated and decoded data (e.g., PSCCH, PSSCH, PSFCH, measurement data, and/or sensor data records) to the SPS release module 1308 for processing. The antennas 1316 may include multiple antennas of similar or different designs in order to sustain multiple transmission links.

In some aspects, the transceiver 1310 is configured to communicate with the base station to receive from the base station and via a physical downlink control channel (PDCCH) at a slot of a radio frame structure having a first numerology, a semi-persistent scheduling (SPS) release configured to release at the UE a SPS configuration configured to schedule a plurality of SPS physical downlink shared channel (PDSCH) transmission occasions at multiple slots of a radio frame structure having a second numerology different from the first numerology. In some aspects, each slot of the multiple slots of the radio frame structure having the second numerology may coincide or align with the slot of the radio frame structure having the first numerology. Further, at least a portion of the plurality of SPS PDSCH transmission occasions can overlap in time with the SPS release.

In an aspect, the UE 1300 can include multiple transceivers 510 implementing different RATs (e.g., NR and LTE). In an aspect, the UE 1300 can include a single transceiver 1310 implementing multiple RATs (e.g., NR and LTE). In an aspect, the transceiver 1310 can include various components, where different combinations of components can implement different RATs.

Figure 14:
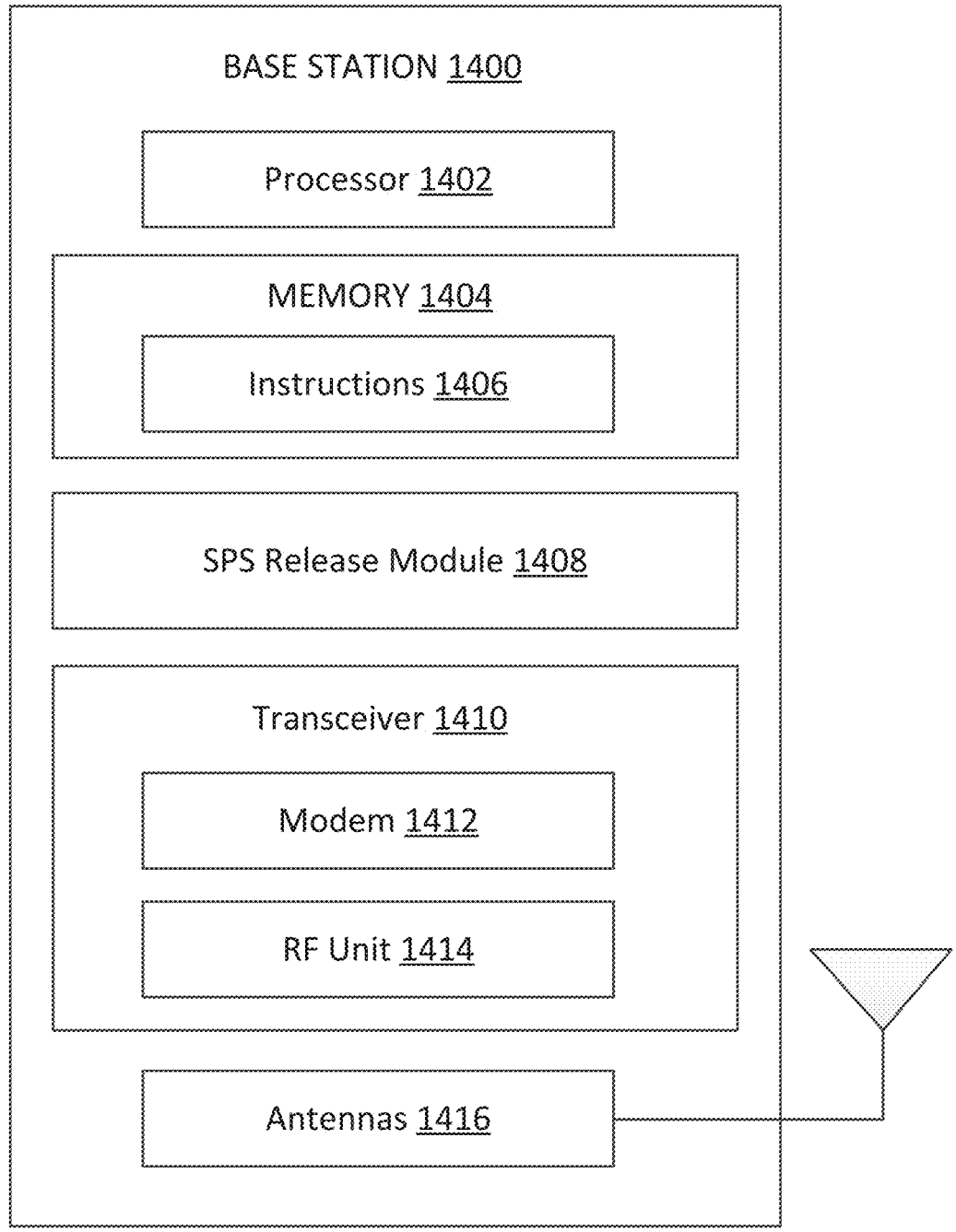
FIG. 14 is a block diagram of an exemplary base station (BS) according to aspects of the present disclosure.

FIG. 14 is a block diagram of an exemplary base station (BS) 1400 according to some aspects of the present disclosure. The BS 1400 may be a BS 105 discussed above in FIG. 1. As shown, the BS 1400 may include a processor 1402, a memory 1404, a SPS release module 1408, a transceiver 1410 including a modem subsystem 1412 and a radio frequency (RF) unit 1414, and one or more antennas 1416. These elements may be in direct or indirect communication with each other, for example via one or more buses.

The processor 1402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1404 includes a non-transitory computer-readable medium. The memory 1404 may store, or have recorded thereon, instructions 1406. The instructions 1406 may include instructions that, when executed by the processor 1402, cause the processor 1402 to perform the operations described herein in connection with aspects of the present disclosure, for example, aspects of FIGS. 1-12. Instructions 1406 may also be referred to as program code, which may be interpreted broadly to include any type of computer-readable statement(s) as discussed above with respect to FIG. 6.

The SPS release module 1408 may be implemented via hardware, software, or combinations thereof. For example, the SPS release module 1408 may be implemented as a processor, circuit, and/or instructions 1406 stored in the memory 1404 and executed by the processor 1402. In some examples, the SPS release module 1408 can be integrated within the modem subsystem 712. For example, the SRS module 708 can be implemented by a combination of software components (e.g., executed by a DSP or a general processor) and hardware components (e.g., logic gates and circuitry) within the modem subsystem 1412.

The SPS release module 1408 may be used for various aspects of the present disclosure, for example, aspects of FIGS. 1-12. The SPS release module 1408 may be configured to transmit via a physical downlink control channel (PDCCH) at a slot of a radio frame structure having a first numerology, a semi-persistent scheduling (SPS) release configured to release at the UE a SPS configuration configured to schedule a plurality of SPS physical downlink shared channel (PDSCH) transmission occasions at multiple slots of a radio frame structure having a second numerology different from the first numerology. In some aspects, each slot of the multiple slots of the radio frame structure having the second numerology may coincide or align with the slot of the radio frame structure having the first numerology. Further, at least a portion of the plurality of SPS PDSCH transmission occasions may overlap in time with the SPS release.

As shown, the transceiver 1410 may include a modem subsystem 1412 and an RF unit 1414. The transceiver 1410 can be configured to communicate bi-directionally with other devices, such as the BSs 105. The modem subsystem 1412 may be configured to modulate and/or encode the data from the memory 1404 according to a modulation and coding scheme (MCS), e.g., a low-density parity check (LDPC) coding scheme, a turbo coding scheme, a convolutional coding scheme, a digital beamforming scheme, etc. The RF unit 1414 may be configured to process (e.g., perform analog to digital conversion or digital to analog conversion, etc.) modulated/encoded data (e.g., PUSCH signal, UL data, SRSs, UE capability reports, RI reports) from the modem subsystem 1412 (on outbound transmissions) or of transmissions originating from another source such as a UE 115 or a BS 105. The RF unit 1414 may be further configured to perform analog beamforming in conjunction with the digital beamforming. Although shown as integrated together in transceiver 1410, the modem subsystem 1412 and the RF unit 1414 may be separate devices that are coupled together at the BS 1400 to enable the BS 1400 to communicate with other devices.

The RF unit 1414 may provide modulated and/or processed data, e.g. data packets (or, more generally, data messages that may contain one or more data packets and other information), to the antennas 1416 for transmission to one or more other devices. The antennas 1416 may further receive data messages transmitted from other devices. The antennas 1416 may provide the received data messages for processing and/or demodulation at the transceiver 1410. The transceiver 1410 may provide the demodulated and decoded data (e.g., PDSCH signal, PDCCH, DL data, SRS resource configuration, SRS resource activation, SRS resource deactivation) to the SPS release module 1408. The antennas 1416 may include multiple antennas of similar or different designs in order to sustain multiple transmission links. The RF unit 1414 may configure the antennas 1416.

In an aspect, the BS 1400 can include multiple transceivers 1410 implementing different RATs (e.g., NR and LTE). In an aspect, the BS 1400 can include a single transceiver 1410 implementing multiple RATs (e.g., NR and LTE). In an aspect, the transceiver 410 can include various components, where different combinations of components can implement different RATs.

Figure 15:
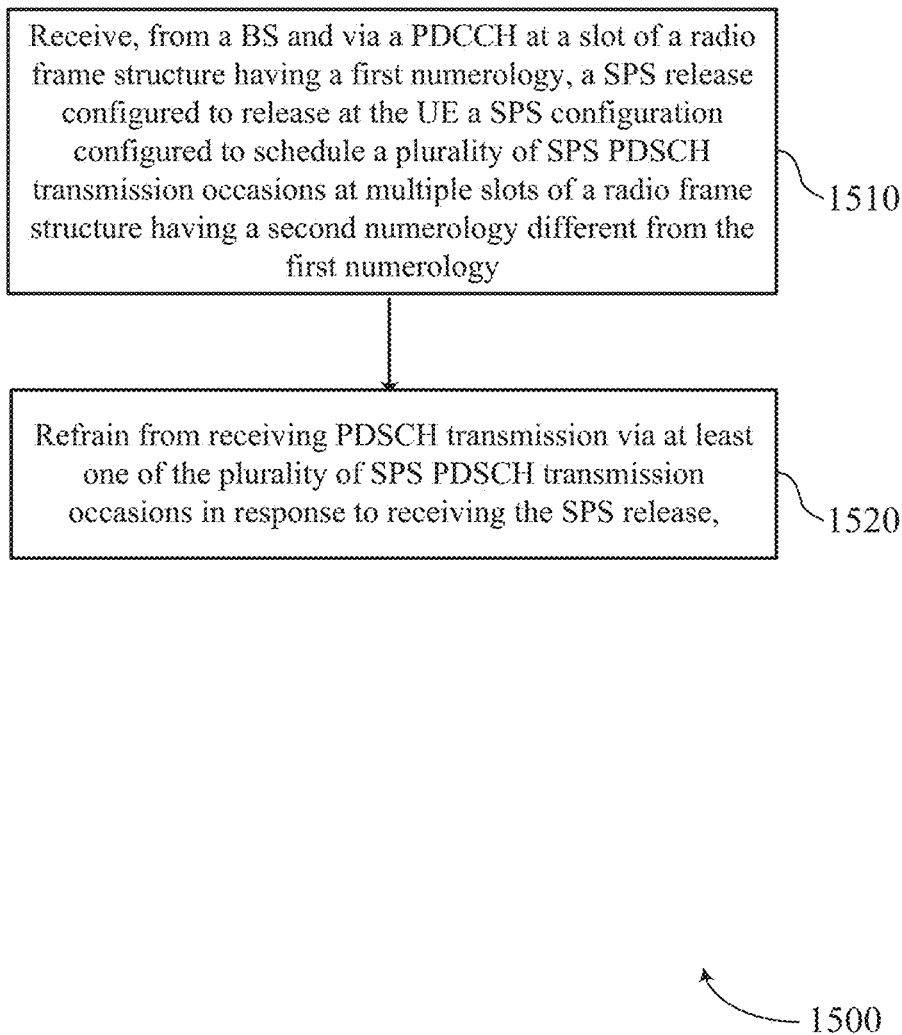
FIG. 15 illustrates a flow diagram of a wireless communication method according to some aspects of the present disclosure.

FIG. 15 is a flow diagram of a wireless communication method 1500 according to some aspects of the present disclosure. Aspects of the method 1500 can be executed by a computing device (e.g., a processor, processing circuit, and/or other suitable component) of a wireless communication device or other suitable means for performing the steps. For example, a wireless communication device, such as the UEs 115 may utilize one or more components, such as the processor 1302, the memory 1304, the SPS Release module 1308, the transceiver 1310, the modem 1312, and the one or more antennas 1316, to execute the steps of method 1500. As illustrated, the method 1500 includes a number of enumerated steps, but aspects of the method 1500 may include additional steps before, after, and in between the enumerated steps. In some aspects, one or more of the enumerated steps may be omitted or performed in a different order.

At block 1510, a UE (e.g., the UEs 115) can receive, from a base station (BS) and via a physical downlink control channel (PDCCH) at a slot of a radio frame structure having a first numerology, a semi-persistent scheduling (SPS) release configured to release at the UE a SPS configuration configured to schedule a plurality of SPS physical downlink shared channel (PDSCH) transmission occasions at multiple slots of a radio frame structure having a second numerology different from the first numerology. In some instances, each slot of the multiple slots of the radio frame structure having the second numerology may coincide or align with the slot of the radio frame structure having the first numerology. Further, at least a portion of the plurality of SPS PDSCH transmission occasions may overlap in time with the SPS release. In some instances, the UE may utilize one or more components, such as the processor 1302, the memory 1304, the SPS Release module 1308, the transceiver 1310, the modem 1312, and the one or more antennas 1316, to receive, from a base station (BS) and via a physical downlink control channel (PDCCH) at a slot of a radio frame structure having a first numerology, a semi-persistent scheduling (SPS) release configured to release at the UE a SPS configuration configured to schedule a plurality of SPS physical downlink shared channel (PDSCH) transmission occasions at multiple slots of a radio frame structure having a second numerology different from the first numerology.

At block 1520, the UE can determine, in response to the receiving the SPS release, whether data transmission is received at the UE via at least one of the plurality of SPS PDSCH transmission occasions. For example, in some instances, the UE may refrain from receiving data transmission via at least one of the plurality of SPS PDSCH transmission occasions in response to the receiving the SPS release. In some instances, the UE may utilize one or more components, such as the processor 1302, the memory 1304, the SPS Release module 1308, the transceiver 1310, the modem 1312, and the one or more antennas 1316, to determine, in response to the receiving the SPS release, whether data transmission is received at the UE via at least one of the plurality of SPS PDSCH transmission occasions (e.g., and in some cases to refrain from receiving data transmission via at least one of the plurality of SPS PDSCH transmission occasions in response to the receiving the SPS release).

Some aspects of method 1500 may further comprise the UE determining that no data transmission is received at the UE via a SPS PDSCH transmission occasion of the plurality of SPS PDSCH transmission occasions that is last in time, of the plurality of SPS PDSCH transmission occasions, to overlap with the SPS release. In some aspects, the SPS configuration configures the plurality of SPS PDSCH transmission occasions with a configuration index, and the SPS release includes a downlink control information (DCI) having a hybrid automatic request (HARQ) process number (HPN) field indicating the configuration index. In some aspects, the plurality of SPS PDSCH transmission occasions are configured with a periodicity of one slot.

Some aspects of method 1500 may further comprise transmitting, to the BS and via a same slot of a physical uplink control channel (PUCCH), a first HARQ acknowledgement or negative acknowledgment (ACK/NACK) for the SPS release and a second HARQ ACK/NACK for the SPS PDSCH transmission occasion that is last in time to overlap with the SPS release. Some aspects of method 1500 may comprise transmitting, to the BS and for the SPS release, a one-bit HARQ ACK/NACK associated to a time domain resource allocation (TDRA) of the SPS PDSCH transmission occasion that is last in time to overlap with the SPS release. In some aspects of method 1500, a spacing parameter of the first numerology is less than a spacing parameter of the second numerology.

Figure 16:
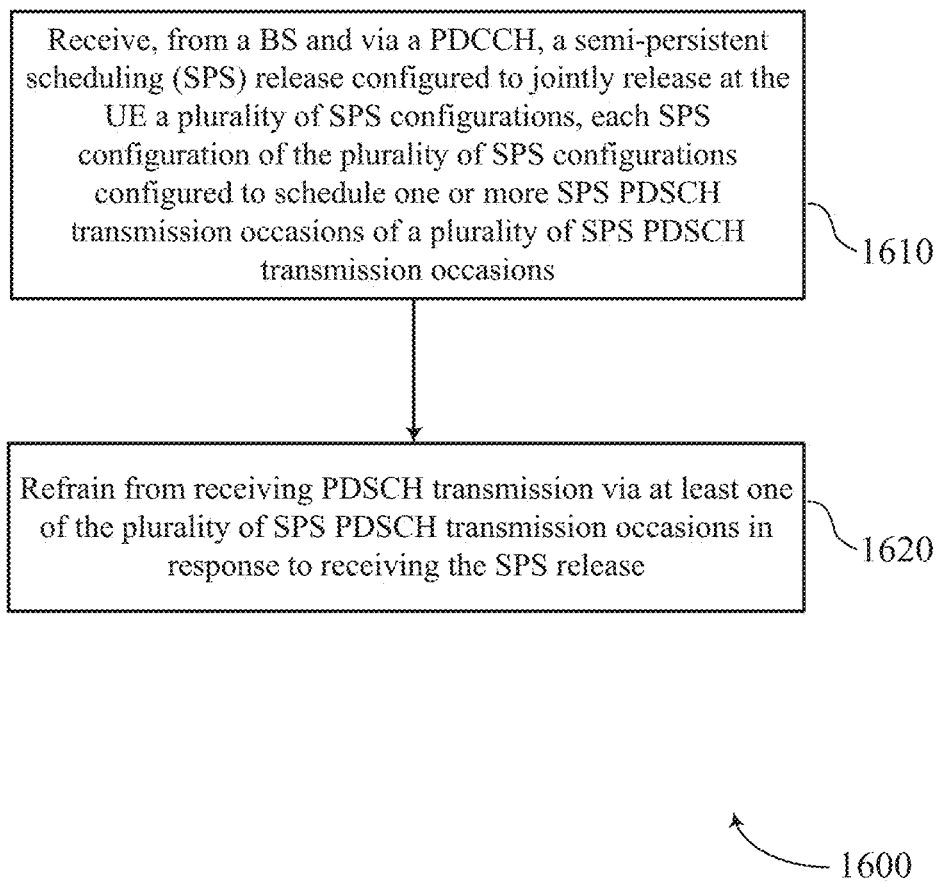
FIG. 16 illustrates a flow diagram of a wireless communication method according to some aspects of the present disclosure.

FIG. 16 is a flow diagram of a wireless communication method 1600 according to some aspects of the present disclosure. Aspects of the method 1600 can be executed by a computing device (e.g., a processor, processing circuit, and/or other suitable component) of a wireless communication device or other suitable means for performing the steps. For example, a wireless communication device, such as the UEs 115 may utilize one or more components, such as the processor 1302, the memory 1304, the SPS Release module 1308, the transceiver 1310, the modem 1312, and the one or more antennas 1316, to execute the steps of method 1600. As illustrated, the method 1600 includes a number of enumerated steps, but aspects of the method 1600 may include additional steps before, after, and in between the enumerated steps. In some aspects, one or more of the enumerated steps may be omitted or performed in a different order.

At block 1610, a UE (e.g., the UEs 115) can receive, from a base station (BS) and via a physical downlink control channel (PDCCH), a semi-persistent scheduling (SPS) release configured to jointly release at the UE a plurality of SPS configurations, each SPS configuration of the plurality of SPS configurations configured to schedule one or more SPS PDSCH transmission occasions of a plurality of SPS PDSCH transmission occasions. In some aspects, the plurality of SPS PDSCH transmission occasions occur in a same slot as the SPS release. Further, at least a portion of the plurality of SPS PDSCH transmission occasions overlap in time with the SPS release. In some instances, the UE may utilize one or more components, such as the processor 1302, the memory 1304, the SPS Release module 1308, the transceiver 1310, the modem 1312, and the one or more antennas 1316, to receive, from a base station (BS) and via a physical downlink control channel (PDCCH), a semi-persistent scheduling (SPS) release configured to jointly release at the UE a plurality of SPS configurations, each SPS configuration of the plurality of SPS configurations configured to schedule one or more SPS PDSCH transmission occasions of a plurality of SPS PDSCH transmission occasions.

At block 1620, the UE can determine, in response to the receiving the SPS release, whether data transmission is received via at least one of the plurality of SPS PDSCH transmission occasions. For example, in some instances, the UE may refrain from receiving data transmission via at least one of the plurality of SPS PDSCH transmission occasions in response to the receiving the SPS release. In some instances, the UE may utilize one or more components, such as the processor 1302, the memory 1304, the SPS Release module 1308, the transceiver 1310, the modem 1312, and the one or more antennas 1316, to determine, in response to the receiving the SPS release, whether data transmission is received via at least one of the plurality of SPS PDSCH transmission occasions (e.g., to refrain from receiving data transmission via at least one of the plurality of SPS PDSCH transmission occasions in response to the receiving the SPS release).

In some aspects of method 1600, the SPS release terminates prior to a termination of a SPS PDSCH transmission occasion of the plurality of SPS PDSCH transmission occasions that is last in time, of the plurality of SPS PDSCH transmission occasions, to overlap with the SPS release. In some aspects, the SPS release terminates prior to a termination of a SPS PDSCH transmission occasion of the plurality of SPS PDSCH transmission occasions that is first in time, of the plurality of SPS PDSCH transmission occasions, to overlap with the SPS release. In some aspects, the SPS release terminates prior to a termination of a SPS PDSCH transmission occasion with a lowest configuration index.

In some aspects, each SPS PDSCH transmission occasion of the plurality of SPS PDSCH transmission occasions has a configuration index. Further, the SPS release can include a downlink control information (DCI) having a hybrid automatic request (HARQ) process number (HPN) fields indicating the configuration index of each SPS PDSCH transmission occasion of the plurality of SPS PDSCH transmission occasions.

In some aspects of method 1600, no data transmission is received at the UE via any of the plurality of SPS PDSCH transmission occasions occurring in the same slot as the transmission of the SPS release. In some aspects, no data transmission is received at the UE via the at least the portion of the plurality of SPS PDSCH transmission occasions overlapping with the SPS release. In some aspects, no data transmission is received at the UE via a SPS PDSCH transmission occasion of the plurality of SPS PDSCH transmission occasions that is scheduled to transmit data after termination of the SPS release. In some aspects, no data transmission is received at the UE via a SPS PDSCH transmission occasion of the plurality of SPS PDSCH transmission occasions with a lowest configuration index.

Some aspects of method 1600 further comprise transmitting, to the BS and via a same slot of a physical uplink control channel (PUCCH), a first HARQ acknowledgement or negative acknowledgment (ACK/NACK) for the SPS release and a second HARQ ACK/NACK for the SPS PDSCH transmission occasion of the plurality of SPS PDSCH transmission occasions with the lowest configuration index.

Some aspects of method 1600 further comprise transmitting, to the BS, (i) a first HARQ acknowledgement or negative acknowledgment (ACK/NACK) for the SPS release via a first slot of a physical uplink control channel (PUCCH); and (ii) a second HARQ ACK/NACK for the SPS PDSCH transmission occasion with the lowest configuration index via a second slot of the PUCCH different from the first slot.

Figure 17:
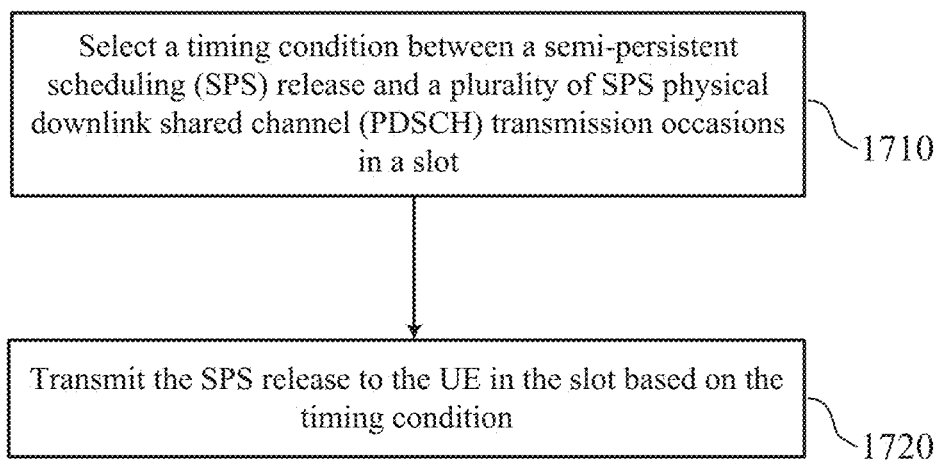
FIG. 17 illustrates a flow diagram of a wireless communication method according to some aspects of the present disclosure.

FIG. 17 is a flow diagram of a wireless communication method 1700 according to some aspects of the present disclosure. Aspects of the method 1700 can be executed by a computing device (e.g., a processor, processing circuit, and/or other suitable component) of a wireless communication device or other suitable means for performing the steps. For example, a wireless communication device, such as the BSs 105 may utilize one or more components, such as the processor 1402, the memory 1404, the SPS Release module 1408, the transceiver 1410, the modem 1412, and the one or more antennas 1416, to execute the steps of method 1700. As illustrated, the method 1700 includes a number of enumerated steps, but aspects of the method 1700 may include additional steps before, after, and in between the enumerated steps. In some aspects, one or more of the enumerated steps may be omitted or performed in a different order.

At block 1710, a BS (e.g., the BSs 105) can determine or identify a timing condition between a semi-persistent scheduling (SPS) release and a plurality of SPS physical downlink shared channel (PDSCH) transmission occasions in a slot. In some aspects, the SPS release may be configured to jointly release at a user equipment (UE) a plurality of SPS configurations. Further, each SPS configuration of the plurality of SPS configurations may be configured to schedule one or more of the plurality of SPS PDSCH transmission occasions. In some instances, the BS may utilize one or more components, such as the processor 1402, the memory 1404, the SPS Release module 1408, the transceiver 1410, the modem 1412, and the one or more antennas 1416, to determine or identify a timing condition between a semi-persistent scheduling (SPS) release and a plurality of SPS physical downlink shared channel (PDSCH) transmission occasions in a slot.

At block 1720, the BS may transmit the SPS release to the UE in the slot based on the timing condition. In some instances, the BS may utilize one or more components, such as the processor 1402, the memory 1404, the SPS Release module 1408, the transceiver 1410, the modem 1412, and the one or more antennas 1416, to transmit the SPS release to the UE in the slot based on the timing condition.

In some aspects of method 1700, the timing condition specifies that the SPS release ends prior to a SPS PDSCH transmission occasion of the plurality of SPS PDSCH transmission occasions that ends first in time. In some aspects, each SPS PDSCH transmission occasion of the plurality of SPS PDSCH transmission occasions has a configuration index; and the SPS release includes a downlink control information (DCI) having a hybrid automatic request (HARD) process number (HPN) field indicating the configuration indices of the plurality of SPS configurations. In some aspects, no data transmission is received at the UE, i.e., the BS refrains from transmitting data transmission to the UE, via any of the plurality of SPS PDSCH transmission occasions in the slot in response to the transmitting of the SPS release.

Some aspects of method 1700 further comprise receiving, from the UE and via a slot of a physical uplink control channel (PUCCH), a HARQ acknowledgement or negative acknowledgment (ACK/NACK) for the SPS release. In some aspects, the HARQ ACK/NACK for the SPS release is transmitted on a location in a HARQ-ACK codebook that corresponds to a PDSCH transmission occasion of the plurality of PDSCH transmission occasions with a lowest configuration index. In some aspects, the SPS release is a first SPS release of a plurality of SPS releases by a single DCI format; and the HARQ ACK/NACK for the first SPS release is transmitted on a location in a HARQ-ACK codebook for HARQ-ACK information corresponding to the plurality of SPS releases that is same as for a corresponding SPS PDSCH reception with a lowest configuration index among the plurality of SPS releases.

In some aspects of method 1700, no HARQ acknowledgement or negative acknowledgment (ACK/NACK) is received at the BS from the UE for the plurality of SPS PDSCH transmission occasions. In some aspects, the timing condition specifies that at least a portion of the plurality of SPS PDSCH transmission occasions overlaps in time with the SPS release.

Recitations of Some Aspects of the Present Disclosure

Aspect 1: A method of wireless communication performed by a user equipment (UE), the method comprising: receiving, from a base station (BS) and via a physical downlink control channel (PDCCH), a semi-persistent scheduling (SPS) release configured to jointly release at the UE a plurality of SPS configurations, each SPS configuration of the plurality of SPS configurations configured to schedule one or more SPS physical downlink shared channel (PDSCH) transmission occasions of a plurality of SPS PDSCH transmission occasions, the plurality of SPS PDSCH transmission occasions occurring in a same slot as the SPS release; and refraining from receiving data transmission via at least one of the plurality of SPS PDSCH transmission occasions in response to the receiving the SPS release.

Aspect 2: The method of aspect 1, wherein the SPS release ends prior to an end of a last symbol of a SPS PDSCH transmission occasion of the plurality of SPS PDSCH transmission occasions that ends first in time.

Aspect 3: The method of aspect 1 or 2, wherein: each SPS PDSCH transmission occasion of the plurality of SPS PDSCH transmission occasions has a configuration index; and the SPS release includes a downlink control information (DCI) having a hybrid automatic request (HARQ) process number (HPN) field indicating the configuration indices of the plurality of SPS configurations.

Aspect 4: The method of any of aspects 1-3, wherein no data transmission is received at the UE via any of the plurality of SPS PDSCH transmission occasions occurring in the same slot as the transmission of the SPS release.

Aspect 5: The method of any of aspects 1-4, further comprising: transmitting, to the BS and via a slot of a physical uplink control channel (PUCCH), a HARQ acknowledgement or negative acknowledgment (ACK/NACK) for the SPS release.

Aspect 6: The method of aspect 5, wherein the HARQ ACK/NACK for the SPS release is transmitted on a location in a HARQ-ACK codebook that corresponds to a PDSCH transmission occasion of the plurality of PDSCH transmission occasions with a lowest configuration index.

Aspect 7: The method of aspect 5, wherein: the SPS release is a first SPS release of a plurality of SPS releases by a single DCI format; and the HARQ ACK/NACK for the first SPS release is transmitted on a location in a HARQ-ACK codebook for HARQ-ACK information corresponding to the plurality of SPS releases that is same as for a corresponding SPS PDSCH reception with a lowest configuration index among the plurality of SPS releases.

Aspect 8: The method of any of aspects 1-7, further comprising: refraining from transmitting, to the BS, a HARQ acknowledgement or negative acknowledgment (ACK/NACK) for the plurality of SPS PDSCH transmission occasions.

Aspect 9: The method of any of aspects 1-8, wherein at least a portion of the plurality of SPS PDSCH transmission occasions overlaps in time with the SPS release.

Aspect 10: A method of wireless communication performed by a base station (BS), the method comprising: identifying a timing condition between a semi-persistent scheduling (SPS) release and a plurality of SPS physical downlink shared channel (PDSCH) transmission occasions in a slot, the SPS release configured to jointly release at a user equipment (UE) a plurality of SPS configurations; and each SPS configuration of the plurality of SPS configurations configured to schedule one or more of the plurality of SPS PDSCH transmission occasions; and transmitting the SPS release to the UE in the slot based on the timing condition.

Aspect 11: The method of aspect 10, wherein the timing condition specifies that the SPS release ends prior to a SPS PDSCH transmission occasion of the plurality of SPS PDSCH transmission occasions that ends first in time.

Aspect 12: The method of aspect 10 or 11, wherein: each SPS PDSCH transmission occasion of the plurality of SPS PDSCH transmission occasions has a configuration index; and the SPS release includes a downlink control information (DCI) having a hybrid automatic request (HARQ) process number (HPN) field indicating the configuration indices of the plurality of SPS configurations.

Aspect 13: The method of any of aspects 10-12, wherein no data transmission is received at the UE via any of the plurality of SPS PDSCH transmission occasions in the slot in response to the transmitting of the SPS release.

Aspect 14: The method of any of aspects 10-13, further comprising: receiving, from the UE and via a slot of a physical uplink control channel (PUCCH), a HARQ acknowledgement or negative acknowledgment (ACK/NACK) for the SPS release.

Aspect 15: The method of aspect 14, wherein the HARQ ACK/NACK for the SPS release is transmitted on a location in a HARQ-ACK codebook that corresponds to a PDSCH transmission occasion of the plurality of PDSCH transmission occasions with a lowest configuration index.

Aspect 16: The method of aspect 14, wherein: the SPS release is a first SPS release of a plurality of SPS releases by a single DCI format; and the HARQ ACK/NACK for the first SPS release is transmitted on a location in a HARQ-ACK codebook for HARQ-ACK information corresponding to the plurality of SPS releases that is same as for a corresponding SPS PDSCH reception with a lowest configuration index among the plurality of SPS releases.

Aspect 17: The method of any of aspects 10-16, wherein no HARQ acknowledgement or negative acknowledgment (ACK/NACK) is received at the BS from the UE for the plurality of SPS PDSCH transmission occasions.

Aspect 18: The method of any of aspects 10-17, wherein the timing condition specifies that at least a portion of the plurality of SPS PDSCH transmission occasions overlaps in time with the SPS release.

Aspect 19: A method of wireless communication performed by a user equipment (UE), the method comprising: receiving, from a base station (BS) and via a physical downlink control channel (PDCCH) at a slot of a radio frame structure having a first numerology, a semi-persistent scheduling (SPS) release configured to release at the UE a SPS configuration configured to schedule a plurality of SPS physical downlink shared channel (PDSCH) transmission occasions at multiple slots of a radio frame structure having a second numerology different from the first numerology, the slot of the radio frame structure having the first numerology coinciding with the multiple slots of the radio frame structure having the second numerology; and refraining from receiving data transmission via at least one of the plurality of SPS PDSCH transmission occasions in response to the receiving the SPS release.

Aspect 20: The method of aspect 19, wherein the plurality of SPS PDSCH transmission occasions correspond to repetitions of same transport block transmitted using the SPS configuration.

Aspect 21: The method of aspect 19 or 20, wherein a SPS PDSCH transmission occasion of the plurality of SPS PDSCH transmission occasions that is last in time overlaps in time with the SPS release.

Aspect 22: The method of any of aspects 19-21, wherein the SPS release ends prior to an end of any of the plurality of SPS PDSCH transmission occasions.

Aspect 23: The method of any of aspects 19-22, wherein no data transmission is received at the UE via any SPS PDSCH transmission occasion of the plurality of SPS PDSCH transmission occasions.

Aspect 24: The method of aspect 23, wherein the SPS PDSCH transmission occasion of the plurality of SPS PDSCH transmission occasions via which no data transmission is received overlaps in time with the SPS release.

Aspect 25: The method of any of aspects 19-24, wherein the SPS configuration configures the plurality of SPS PDSCH transmission occasions with a configuration index; and the SPS release includes a downlink control information (DCI) having a hybrid automatic request (HARQ) process number (HPN) field indicating the configuration index.

Aspect 26: The method of any of aspects 19-25, further comprising: transmitting, to the BS, a one-bit HARQ ACK/NACK for the SPS release.

Aspect 27: The method of claim 26, wherein the one-bit HARQ ACK/NACK is associated to a time domain resource allocation (TDRA) of the SPS PDSCH transmission occasion that is last in time to overlap with the SPS release.

Aspect 28: The method of claim 26, wherein the one-bit HARQ ACK/NACK is associated to a time domain resource allocation (TDRA) of the SPS PDSCH transmission occasion that is first in time to overlap with the SPS release.

Aspect 29: The method of any of aspects 19-28, wherein a spacing parameter of the first numerology is less than a spacing parameter of the second numerology.

Aspect 30: The method of any of aspects 19-29, wherein at least a portion of the plurality of SPS PDSCH transmission occasions overlap in time with the SPS release.

Aspect 31: A user equipment (UE), comprising: a memory; a processor coupled to the memory; and a transceiver coupled to the processor, the UE configured to perform the methods of aspects 1-9.

Aspect 32: A user equipment (BS), comprising: a memory; a processor coupled to the memory; and a transceiver coupled to the processor, the UE configured to perform the methods of aspects 10-18.

Aspect 33: A user equipment (UE), comprising: a memory; a processor coupled to the memory; and a transceiver coupled to the processor, the UE configured to perform the methods of aspects 19-30.

Aspect 34: A user equipment (UE) comprising means for performing the methods of aspects 1-9.

Aspect 35: A user equipment (BS) comprising means for performing the methods of aspects 10-18.

Aspect 36: A user equipment (UE) comprising means for performing the methods of aspects 19-30.

Aspect 37: A non-transitory computer-readable medium (CRM) having program code recorded thereon, the program code comprises code for causing a UE to perform the methods of aspects 1-9.

Aspect 38: A non-transitory computer-readable medium (CRM) having program code recorded thereon, the program code comprises code for causing a BS to perform the methods of aspects 10-18.

Aspect 39: A non-transitory computer-readable medium (CRM) having program code recorded thereon, the program code comprises code for causing a UE to perform the methods of aspects 19-30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication performed by a user equipment (UE), the method comprising:
    monitoring for a semi-persistent scheduling (SPS) release from a base station (BS) via a physical downlink control channel (PDCCH), configured to jointly release at the UE a plurality of SPS configurations, each SPS configuration of the plurality of SPS configurations configured to schedule one or more SPS physical downlink shared channel (PDSCH) transmission occasions of a plurality of SPS PDSCH transmission occasions; and
    refraining from receiving the SPS release in response to the plurality of SPS PDSCH transmission occasions occurring in a same slot as the SPS release and the SPS release ending after an end of a last symbol of a SPS PDSCH transmission occasion of the plurality of SPS PDSCH transmission occasions.

2. The method of claim 1, wherein:
    each SPS PDSCH transmission occasion of the plurality of SPS PDSCH transmission occasions has a configuration index; and
    the SPS release includes a downlink control information (DCI) having a HARQ process number (HPN) field indicating configuration indices of the plurality of SPS configurations.

3. The method of claim 1, wherein no data transmission is received at the UE via any of the plurality of SPS PDSCH transmission occasions occurring in the same slot as the transmission of the SPS release.

4. The method of claim 1, further comprising:
    transmitting, to the BS and via a slot of a physical uplink control channel (PUCCH), the HARQ ACK/NACK for the SPS release.

5. The method of claim 4, wherein the HARQ ACK/NACK for the SPS release is transmitted on a location in a HARQ-ACK codebook that corresponds to a PDSCH transmission occasion of the plurality of PDSCH transmission occasions with a lowest configuration index.

6. The method of claim 1, further comprising:
refraining from transmitting, to the BS, a HARQ acknowledgement or negative acknowledgment (ACK/NACK) for the plurality of SPS PDSCH transmission occasions.

7. The method of claim 1, wherein at least a portion of the plurality of SPS PDSCH transmission occasions overlaps in time with the SPS release.

8. A user equipment (UE), comprising:
a processor; and
a transceiver coupled to the processor and configured to:
monitor for a semi-persistent scheduling (SPS) release from a base station (BS) and via a physical downlink control channel (PDCCH), configured to jointly release at the UE a plurality of SPS configurations, each SPS configuration of the plurality of SPS configurations configured to schedule one or more SPS physical downlink shared channel (PDSCH) transmission occasions of a plurality of SPS PDSCH transmission occasions; and
refrain from receiving the SPS release in response to the plurality of SPS PDSCH transmission occasions occurring in a same slot as the SPS release and the SPS release ending after an end of a last symbol of a SPS PDSCH transmission occasion of the plurality of SPS PDSCH transmission occasions.

9. The UE of claim 8, wherein:
each SPS PDSCH transmission occasion of the plurality of SPS PDSCH transmission occasions has a configuration index; and
the SPS release includes a downlink control information (DCI) having a HARQ process number (HPN) field indicating the configuration indices of the plurality of SPS configurations.

10. The UE of claim 8, wherein no data transmission is received at the UE via any of the plurality of SPS PDSCH transmission occasions occurring in the same slot as the transmission of the SPS release.

11. The UE of claim 8, wherein the transceiver is further configured to:
transmit, to the BS and via a slot of a PUCCH, the HARQ ACK/NACK for the SPS release.

12. The UE of claim 11, wherein the HARQ ACK/NACK for the SPS release is transmitted on a location in a HARQ-ACK codebook that corresponds to a PDSCH transmission occasion of the plurality of PDSCH transmission occasions with a lowest configuration index.

13. The UE of claim 8, wherein the transceiver is further configured to:
refrain from transmitting, to the BS, a HARQ ACK/NACK for the plurality of SPS PDSCH transmission occasions.

14. The UE of claim 8, wherein at least a portion of the plurality of SPS PDSCH transmission occasions overlaps in time with the SPS release.

15. A method of wireless communication performed by a base station (BS), the method comprising:
identifying a timing condition between a semi-persistent scheduling (SPS) release and a plurality of SPS physical downlink shared channel (PDSCH) transmission occasions in a slot,
the SPS release configured to jointly release at a user equipment (UE) a plurality of SPS configurations; and
each SPS configuration of the plurality of SPS configurations configured to schedule one or more of the plurality of SPS PDSCH transmission occasions; and
refraining from transmitting the SPS release to the UE in the slot based on the timing condition.

16. The method of claim 15, wherein the timing condition specifies that the SPS release ends after a SPS PDSCH transmission occasion of the plurality of SPS PDSCH transmission occasions that ends first in time.

17. The method of claim 15, wherein:
each SPS PDSCH transmission occasion of the plurality of SPS PDSCH transmission occasions has a configuration index; and
the SPS release includes a downlink control information (DCI) having a HARQ process number (HPN) field indicating the configuration indices of the plurality of SPS configurations.

18. A base station (BS), comprising:
a processor; and
a transceiver coupled to the processor and configured to:
identify a timing condition between a semi-persistent scheduling (SPS) release and a plurality of SPS physical downlink shared channel (PDSCH) transmission occasions in a slot,
the SPS release configured to jointly release at a user equipment (UE) a plurality of SPS configurations; and
each SPS configuration of the plurality of SPS configurations configured to schedule one or more of the plurality of SPS PDSCH transmission occasions;
refrain from transmitting the SPS release to the UE in the slot based on the timing condition.

19. The BS of claim 18, wherein the timing condition specifies that the SPS release ends after a SPS PDSCH transmission occasion of the plurality of SPS PDSCH transmission occasions that ends first in time.

20. The BS of claim 18, wherein:
each SPS PDSCH transmission occasion of the plurality of SPS PDSCH transmission occasions has a configuration index; and
the SPS release includes a downlink control information (DCI) having a hybrid automatic request (HARQ) process number (HPN) field indicating the configuration indices of the plurality of SPS configurations.

21. A method of wireless communication performed by a user equipment (UE), the method comprising:
monitoring for a semi-persistent scheduling (SPS) release from a base station (BS) via a physical downlink control channel (PDCCH) at a slot of a radio frame structure having a first numerology, a semi-persistent scheduling (SPS) release configured to release at the UE a SPS configuration configured to schedule a plurality of SPS physical downlink shared channel (PDSCH) transmission occasions at multiple slots of a radio frame structure having a second numerology different from the first numerology, the slot of the radio frame structure having the first numerology coinciding with the multiple slots of the radio frame structure having the second numerology; and
refraining from receiving the SPS release in response to the SPS release ending after an end of a last symbol of a SPS PDSCH transmission occasion of the plurality of SPS PDSCH transmission occasions in the slot.

22. The method of claim 21, wherein the plurality of SPS PDSCH transmission occasions correspond to repetitions of same transport block transmitted using the SPS configuration.

23. The method of claim 21, wherein a SPS PDSCH transmission occasion of the plurality of SPS PDSCH transmission occasions that is last in time overlaps in time with the SPS release.

24. The method of claim 21, wherein no data transmission is received at the UE via any SPS PDSCH transmission occasion of the plurality of SPS PDSCH transmission occasions.

25. The method of claim 24, wherein the SPS PDSCH transmission occasion of the plurality of SPS PDSCH transmission occasions via which no data transmission is received overlaps in time with the SPS release.

26. The method of claim 21, wherein:
the SPS configuration configures the plurality of SPS PDSCH transmission occasions with a configuration index; and
the SPS release includes a downlink control information (DCI) having a HARQ process number (HPN) field indicating the configuration index.

27. The method of claim 21, wherein a spacing parameter of the first numerology is less than a spacing parameter of the second numerology.

28. The method of claim 21, wherein at least a portion of the plurality of SPS PDSCH transmission occasions overlap in time with the SPS release.

29. A user equipment (UE), comprising:
a processor; and
a transceiver coupled to the processor and configured to:
monitor for a semi-persistent scheduling (SPS) release from a base station (BS) via a physical downlink control channel (PDCCH) at a slot of a radio frame structure having a first numerology, a semi-persistent scheduling (SPS) release configured to release at the UE a SPS configuration configured to schedule a plurality of SPS physical downlink shared channel (PDSCH) transmission occasions at multiple slots of a radio frame structure having a second numerology different from the first numerology, the slot of the radio frame structure having the first numerology coinciding with the multiple slots of the radio frame structure having the second numerology; and
refrain from receiving the SPS release in response to the SPS release ending after an end of a last symbol of a SPS PDSCH transmission occasion of the plurality of SPS PDSCH transmission occasions in the slot.

30. The UE of claim 29, wherein the plurality of SPS PDSCH transmission occasions correspond to repetitions of same transport block transmitted using the SPS configuration.

31. The UE of claim 29, wherein a SPS PDSCH transmission occasion of the plurality of SPS PDSCH transmission occasions that is last in time overlaps in time with the SPS release.

32. The UE of claim 29, wherein no data transmission is received at the UE via any SPS PDSCH transmission occasion of the plurality of SPS PDSCH transmission occasions.

33. The UE of claim 29, wherein the SPS PDSCH transmission occasion of the plurality of SPS PDSCH transmission occasions via which no data transmission is received overlaps in time with the SPS release.

34. The UE of claim 29, wherein:
the SPS configuration configures the plurality of SPS PDSCH transmission occasions with a configuration index; and
the SPS release includes a downlink control information (DCI) having a HARQ process number (HPN) field indicating the configuration index.

35. The UE of claim 29, further the transceiver is further configured to transmit, to the BS, a one-bit HARQ ACK/NACK for the SPS release.

36. The UE of claim 35, wherein the one-bit HARQ ACK/NACK is associated to a time domain resource allocation (TDRA) of the SPS PDSCH transmission occasion that is last in time to overlap with the SPS release.

37. The UE of claim 29, wherein the one-bit HARQ ACK/NACK is associated to a time domain resource allocation (TDRA) of the SPS PDSCH transmission occasion that is first in time to overlap with the SPS release.

38. The UE of claim 29, wherein a spacing parameter of the first numerology is less than a spacing parameter of the second numerology.

39. The UE of claim 29, wherein at least a portion of the plurality of SPS PDSCH transmission occasions overlap in time with the SPS release.

* * * * *